(12) United States Patent
Ito et al.

(10) Patent No.: US 10,599,507 B2
(45) Date of Patent: Mar. 24, 2020

(54) SEMICONDUCTOR APPARATUS AND DISPLAY APPARATUS

(71) Applicant: Japan Display Inc., Tokyo (JP)

(72) Inventors: Takuya Ito, Tokyo (JP); Koji Shimizu, Tokyo (JP)

(73) Assignee: Japan Display Inc., Tokyo (JP)

( * ) Notice: Subject to any disclaimer, the term of this patent is extended or adjusted under 35 U.S.C. 154(b) by 31 days.

(21) Appl. No.: 15/464,602

(22) Filed: Mar. 21, 2017

(65) Prior Publication Data

US 2017/0277586 A1    Sep. 28, 2017

(30) Foreign Application Priority Data

Mar. 28, 2016    (JP) ................. 2016-064290

(51) Int. Cl.
*G06F 11/00*    (2006.01)
*G06F 11/07*    (2006.01)
(Continued)

(52) U.S. Cl.
CPC ........ *G06F 11/079* (2013.01); *G06F 11/0736* (2013.01); *G06F 11/0751* (2013.01);
(Continued)

(58) Field of Classification Search
CPC ............ G06F 11/0757; G06F 11/0736; G06F 11/0751; G06F 11/079
See application file for complete search history.

(56) References Cited

U.S. PATENT DOCUMENTS

| 7,085,947 B2* | 8/2006 | Kabune | G06F 1/24 |
| | | | 361/78 |
| 2003/0211885 A1* | 11/2003 | Fujimoto | G07F 17/32 |
| | | | 463/29 |

(Continued)

FOREIGN PATENT DOCUMENTS

| JP | 07-005841 A | 1/1995 |
| JP | 2015-087471 A | 5/2015 |

OTHER PUBLICATIONS

Japanese Office Action dated Jun. 18, 2019, for corresponding Japanese Patent Application No. 2016-064290.

*Primary Examiner* — Charles Ehne
(74) *Attorney, Agent, or Firm* — Michael Best & Friedrich LLP

(57) ABSTRACT

According to an aspect, a semiconductor apparatus includes semiconductor devices. Each semiconductor device includes: a state monitor that monitors a plurality of functions implemented by the semiconductor device, and outputs state monitoring signals; and an anomaly determination circuit that performs anomaly determination based on the state monitoring signals. When the anomaly determination circuit of a first semiconductor device detects that one or more of the functions of the semiconductor devices are abnormal based on a first anomaly determination result and a second anomaly determination result, the anomaly determination circuit of the first semiconductor device outputs an anomaly detection signal to the semiconductor devices. The first anomaly determination result is a result of the anomaly determination performed on the functions of the first semiconductor device, and the second anomaly determination result is a result of the anomaly determination performed on the functions of a second semiconductor device.

12 Claims, 26 Drawing Sheets

(51) Int. Cl.
*G06F 11/14* (2006.01)
*G09G 3/20* (2006.01)

(52) U.S. Cl.
CPC ......... *G06F 11/0757* (2013.01); *G06F 11/14* (2013.01); *G06F 11/1451* (2013.01); *G06F 11/1469* (2013.01); *G09G 3/20* (2013.01); *G09G 2310/0264* (2013.01); *G09G 2330/12* (2013.01)

(56) References Cited

U.S. PATENT DOCUMENTS

| | | | |
|---|---|---|---|
| 2010/0036517 A1* | 2/2010 | Takizawa | G06F 11/0736 700/110 |
| 2010/0134939 A1* | 6/2010 | Takahashi | H03K 17/0822 361/87 |
| 2010/0185405 A1* | 7/2010 | Aoshima | B60L 3/0046 702/63 |
| 2013/0166172 A1* | 6/2013 | Hara | F02D 45/00 701/102 |
| 2016/0020686 A1* | 1/2016 | Morokuma | H02M 1/08 363/123 |
| 2016/0056064 A1* | 2/2016 | Miki | H01L 27/67288 702/182 |
| 2017/0184678 A1* | 6/2017 | Sekiguchi | G01R 31/3627 |

\* cited by examiner

SEMICONDUCTOR APPARATUS AND DISPLAY APPARATUS

CROSS-REFERENCE TO RELATED APPLICATIONS

This application claims priority from Japanese Application No. 2016-064290, filed on Mar. 28, 2016, the contents of which are incorporated by reference herein in its entirety.

BACKGROUND

1. Technical Field

The present invention relates to a semiconductor apparatus and a display apparatus.

2. Description of the Related Art

There is known a display apparatus having a multidriver configuration in which a plurality of ICs (semiconductor devices) are provided, the ICs (semiconductor devices) having the same function or a similar function for performing image display of one display device (for example, Japanese Patent Application Laid-open Publication No. 07-005841).

Typically, a semiconductor device that displays images on the display apparatus, for example, is required to include a function of diagnosing anomaly such as a failure or malfunction inside an IC and a function of returning from an abnormal state. When a plurality of semiconductor devices having the same function or a similar function are used to make a multidriver configuration for performing image display on a single display device as described above, and the multidriver configuration is a configuration in which anomaly diagnosis and recovery from the abnormal state are performed by each semiconductor device, mismatching may occur among operations of a plurality of semiconductor devices. Accordingly, what is called the "dead lock" occurs, such that a state in which no image is displayed in a part of the display region continues, for example. Such a failure may not be resolved unless all semiconductor devices are reset with external control.

For the foregoing reasons, there is a need for a semiconductor apparatus and a display apparatus that can resolve mismatching among a plurality of semiconductor devices caused by malfunction in one or a plurality of semiconductor devices.

SUMMARY

According to an aspect, a semiconductor apparatus includes a plurality of semiconductor devices. Each semiconductor device includes: a state monitor that monitors a plurality of functions implemented by the semiconductor device, and outputs a plurality of state monitoring signals, each of the state monitoring signals indicating whether a corresponding one of the functions is normal; and an anomaly determination circuit that performs anomaly determination on each of the functions based on the state monitoring signals. When the anomaly determination circuit of a first semiconductor device among the semiconductor devices detects that one or more of the functions of the semiconductor devices are abnormal based on a first anomaly determination result and a second anomaly determination result, the anomaly determination circuit of the first semiconductor device outputs an anomaly detection signal to the semiconductor devices. The first anomaly determination result is a result of the anomaly determination performed on the functions of the first semiconductor device, and the second anomaly determination result is a result of the anomaly determination performed on the functions of a second semiconductor device other than the first semiconductor device among the semiconductor device.

According to another aspect, a display apparatus includes: a display region including a first region and a second region; and a semiconductor apparatus including a substrate at which a master device that performs image display in the first region and a slave device that performs image display in the second region are provided. The master device detects anomaly in the master device or anomaly in the slave device, performs anomaly processing on the master device, and outputs an anomaly detection signal to the slave device. The slave device performs anomaly processing on the slave device based on the anomaly detection signal.

DETAILED DESCRIPTION

Figure 1:
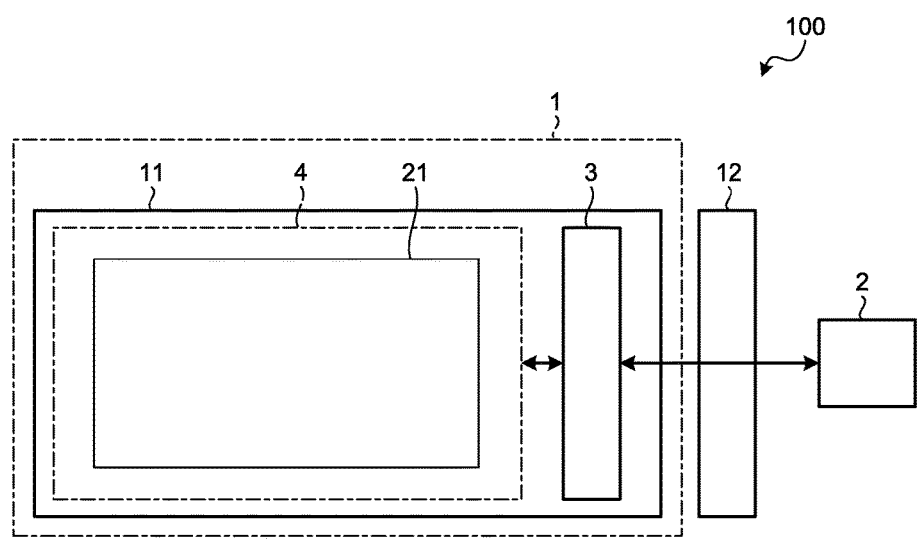
FIG. 1 is a diagram illustrating an example of a schematic configuration of a display system to which a semiconductor apparatus according to a first embodiment is applied.

The following describes a mode for carrying out the invention in detail with reference to the drawings. The present invention is not limited to the embodiments described below. Components described below include a component that is easily conceivable by those skilled in the art and components that are substantially the same. The components described below can be appropriately combined. The disclosure is merely an example, and the present invention naturally encompasses an appropriate modification maintaining the gist of the invention that is easily conceivable by those skilled in the art. To further clarify the description, the width, the thickness, the shape, and the like of each component may be schematically illustrated in the drawings as compared with an actual aspect. However, the drawings merely provide examples, and are not intended to limit interpretation of the invention. The same element as that described in the drawing already discussed is denoted by the same reference numeral throughout the description and the drawings, and detailed description thereof will not be repeated in some cases.

In this disclosure, when an element is described as being "on" another element, the element can be directly on the other element, or there can be one or more elements between the element and the other element.

First Embodiment

FIG. 1 is a diagram illustrating an example of a schematic configuration of a display system to which a semiconductor apparatus according to a first embodiment is applied. A display system 100 illustrated in FIG. 1 includes a display apparatus 1 and a host controller (Host) 2.

The display apparatus 1 is, for example, a liquid crystal display apparatus, and includes a driver 3 and a display device 4 on a glass substrate 11. The driver 3 is coupled to the host controller 2 via a relay substrate 12 including, for example, a flexible printed circuit (FPC) to constitute the display system 100. The display apparatus 1 may be an organic EL such as an organic light emitting diode (OLED).

The host controller 2 includes, for example, a central processing unit (CPU) and a storage device such as a memory, and can implement various functions in the display apparatus 1 by executing a computer program using such hardware resources. The host controller 2 has a function of performing control so that an image to be displayed in a display region 21 of the display apparatus 1 can be handled as information of image input gradation by the driver 3 in accordance with an execution result of the computer program, and performing predetermined processing when a display operation of the display apparatus 1 is not normal, that is, when the display operation of the display apparatus 1 is abnormal. In the present embodiment, an anomaly determination circuit as a functional block of a driver IC (described later) determines whether the display operation of the display apparatus 1 is abnormal. When the anomaly determination circuit of the driver IC determines that the display operation of the display apparatus 1 is abnormal, the host controller 2 performs predetermined processing in accordance with the determination result thereof. Examples of the predetermined processing performed by the host controller 2 when the display operation of the display apparatus 1 is abnormal include processing such as forcibly resetting the driver 3 or causing the driver 3 to be unable to be started, for example. However, the present invention is not limited to such processing performed by the host controller 2.

Figure 2:
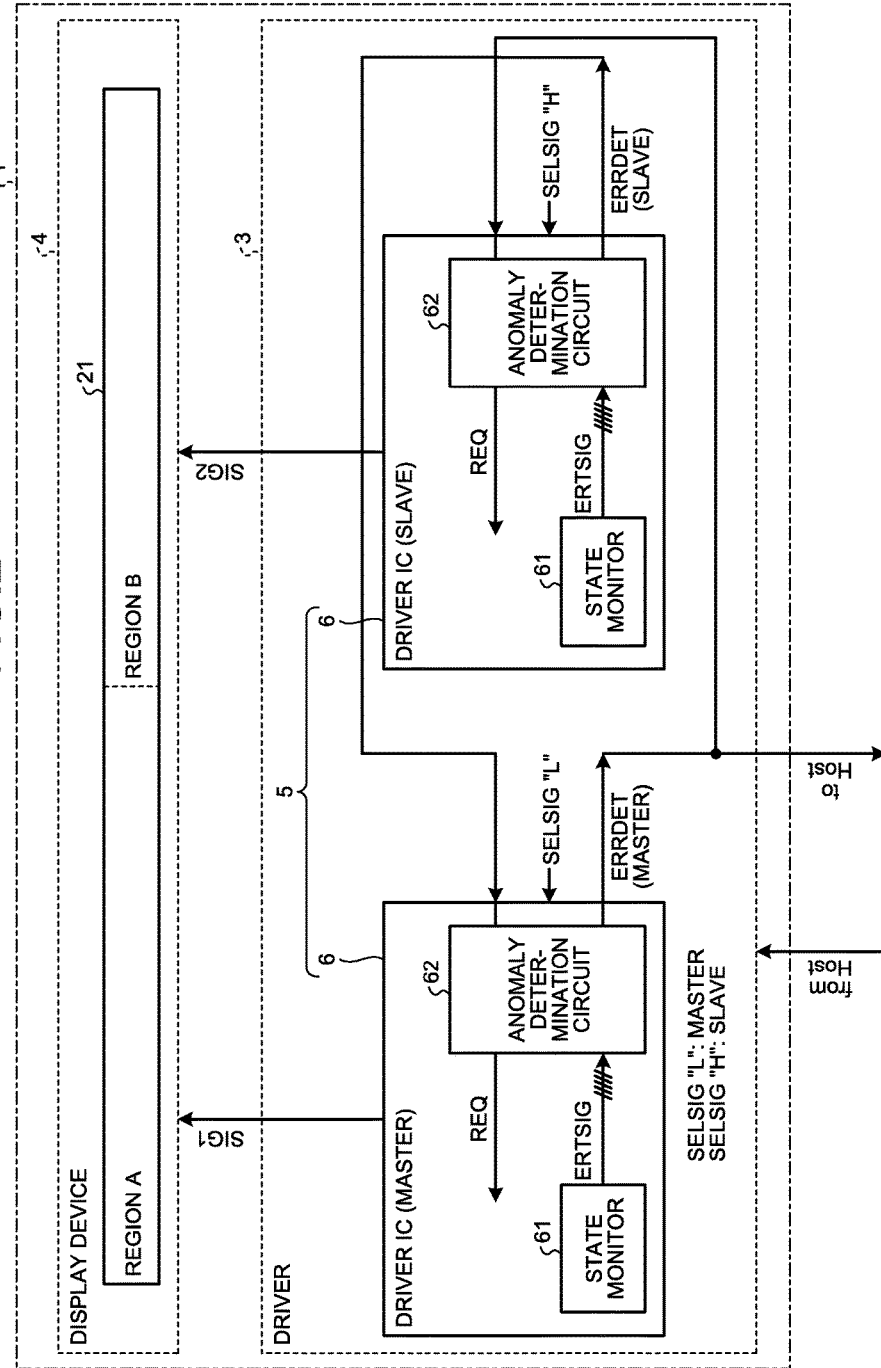
FIG. 2 is a diagram illustrating an example of a block configuration of a display apparatus to which the semiconductor apparatus according to the first embodiment is applied.

FIG. 2 is a diagram illustrating an example of a block configuration of the display apparatus to which the semiconductor apparatus according to the first embodiment is applied. The display apparatus 1 includes the driver 3 and the display device 4.

The driver 3 includes a plurality of (in this case, two) driver ICs (semiconductor devices) 6. In the present embodiment, the driver ICs 6 are semiconductor devices having the same function or a similar function, and included in a semiconductor apparatus 5 according to the present embodiment. That is, the display apparatus 1 according to the present embodiment is a liquid crystal display apparatus having what is called a multidriver configuration.

One of the driver ICs 6 is set as a master device and the other is set as a slave device according to a binary ("L" or "H") selection signal SELSIG. In the present embodiment, the driver IC 6 to which the selection signal SELSIG of "L" is supplied is set as the master device (MASTER) (a first mode), whereas the driver IC 6 to which the selection signal SELSIG of "H" is supplied is set as the slave device (SLAVE) (a second mode). Hereinafter, "(MASTER)" is appended to the driver IC set as the master device and constituent parts thereof, and "(SLAVE)" is appended to the driver IC set as the slave device and constituent parts thereof. When the master device and the slave device are not required to be specifically distinguished from each other, "(MASTER)" and "(SLAVE)" are not appended thereto.

In the example illustrated in FIG. 2, the driver IC (MASTER) 6 (first semiconductor device) performs image display in a left half region A (first region) of the display region 21 of the display device 4, and the driver IC (SLAVE) 6 (second semiconductor device) performs image display in a right half region B (second region) of the display region 21 of the display device 4. In the example illustrated in FIG. 2, when the display apparatus 1 is, for example, a liquid crystal display apparatus, functional blocks such as a gate driver, a source driver, a display control circuit, and a voltage generation circuit in the liquid crystal display apparatus are assumed to be included in the driver IC 6, but the embodiment is not limited thereto.

The driver IC (MASTER) 6 outputs various signals SIG1 for performing image display in the left half region A of the display region 21 of the display device 4. The driver IC (SLAVE) 6 outputs various signals SIG2 for performing image display in the right half region B of the display region 21 of the display device 4. When the display apparatus 1 is, for example, a liquid crystal display apparatus, the various signals SIG are assumed to include a source signal, a gate signal, a timing pulse signal, and the like. Signals and an operation of each component in the driver 3 illustrated in FIG. 2 will be described later in detail.

Figure 3:
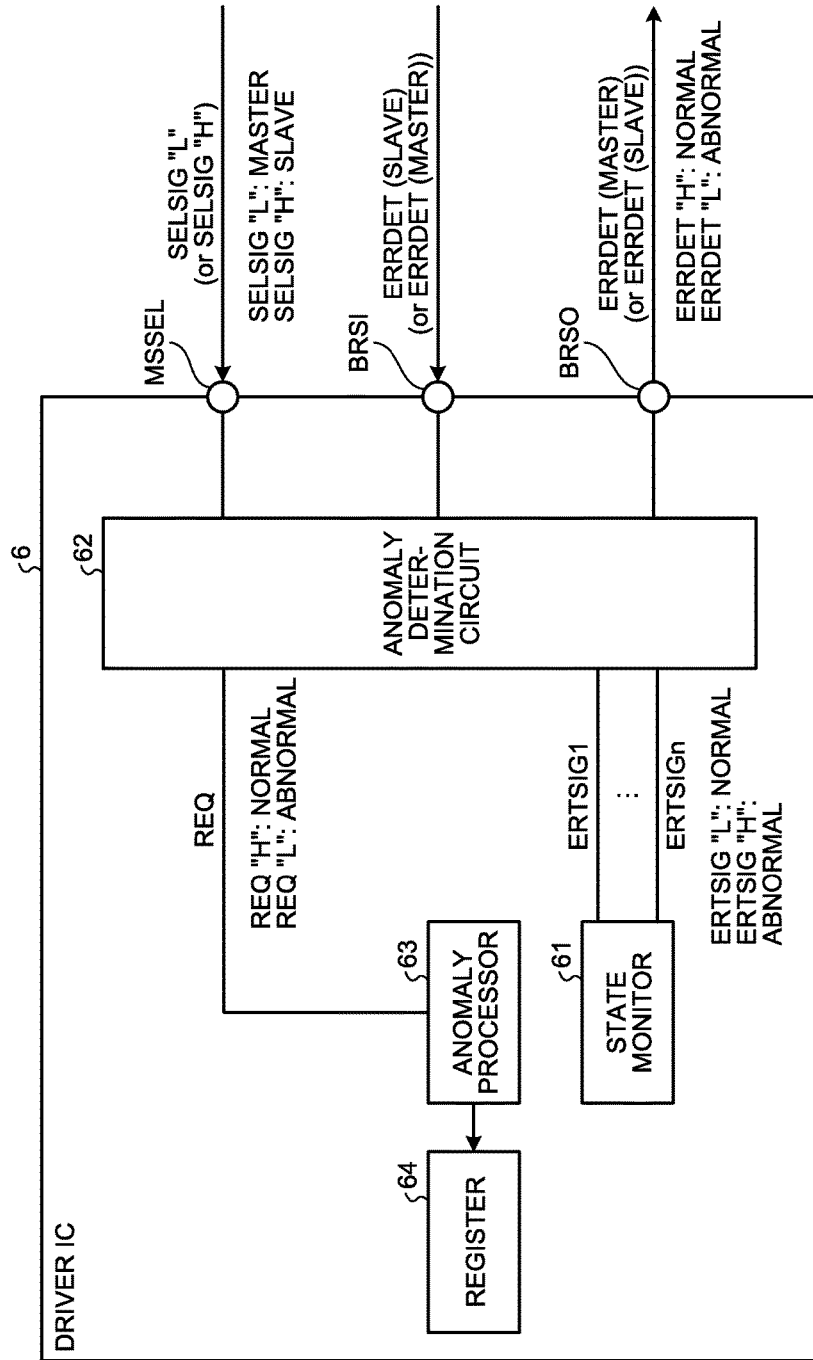
FIG. 3 is a diagram illustrating an example of an internal configuration of a driver IC included in the semiconductor apparatus according to the first embodiment.

FIG. 3 is a diagram illustrating an example of an internal configuration of the driver IC included in the semiconductor apparatus according to the first embodiment.

As described above, one of the driver ICs 6 is set as the master device and the other is set as the slave device according to the binary ("L" or "H") selection signal SELSIG input to an MSSEL terminal from the outside.

The driver IC 6 includes a state monitor 61, an anomaly determination circuit 62, an anomaly processor 63, and a register 64.

The register 64 stores therein an operation parameter value of each function of the driver IC 6. The anomaly processor 63 performs predetermined anomaly processing based on an anomaly processing request signal REQ output from the anomaly determination circuit 62. In other words, the predetermined anomaly processing is a predetermined processing that is performed when the anomaly processing request signal REQ is output, and the anomaly processor 63 is a processor that performs the predetermined processing (anomaly processing) when the anomaly processing request signal REQ is output. The anomaly processors 63 in the driver IC (MASTER) 6 and the driver IC (SLAVE) 6 perform the same kind of anomaly processing. As the predetermined anomaly processing performed by the anomaly processor 63, in the present embodiment, the operation parameter value stored in the register 64 is initialized, for example. The processing in the display system 100 at the time when anomaly occurs is performed by the host controller 2 described above. Thus, as anomaly processing performed by the anomaly processor 63, as described above, for example, the operation parameter value stored in the register 64 is initialized to attempt to return from the abnormal state in the display apparatus 1. When the state is not returned to be normal through the anomaly processing performed by the anomaly processor 63, for example, the host controller 2 may perform predetermined processing such as forcibly resetting the driver 3 or causing the driver 3 to be unable to be started. Examples of the predetermined processing performed by the host controller 2 is not limited thereto and may include various kinds of processing predetermined by a user, an administrator, and the like. Alternatively, by limiting the number of times of anomaly processing performed by the anomaly processor 63, the host controller 2 may perform predetermined processing when the state is not returned to be normal through the anomaly processing performed by the anomaly processor 63 predetermined number of times or more.

Figure 4:
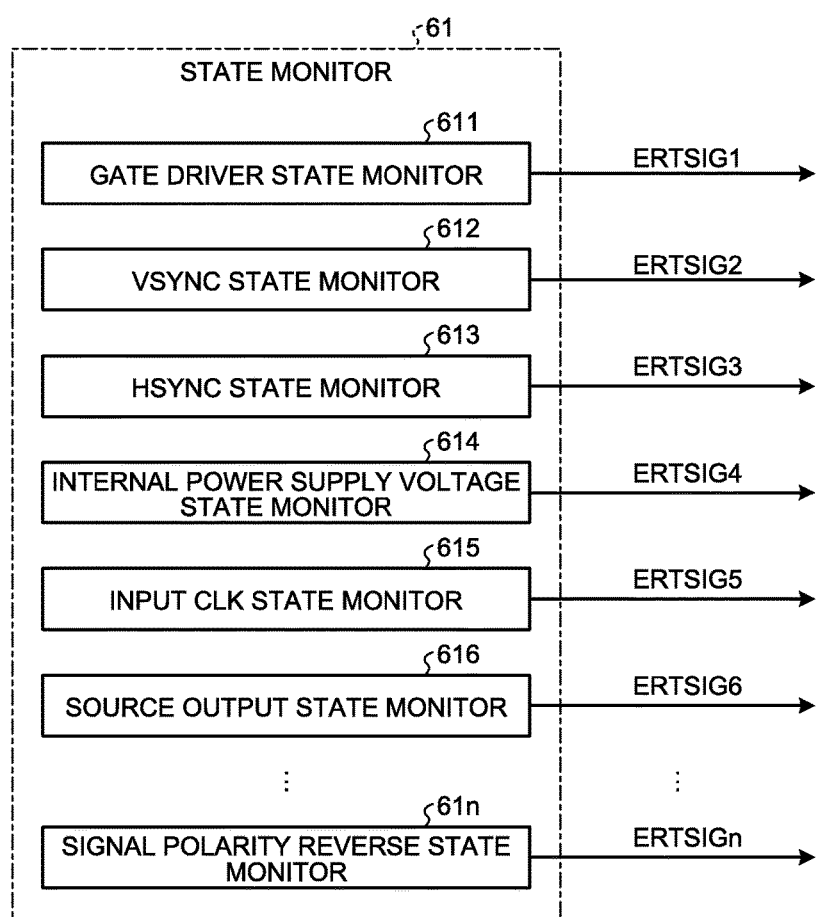
FIG. 4 is a diagram illustrating an example of a state monitor.

FIG. 4 is a diagram illustrating an example of the state monitor. As described above, the driver IC 6 includes functional blocks such as the gate driver, the source driver, the display control circuit, and the voltage generation circuit. In the present embodiment, monitors are provided for monitoring each functional block and a signal required for operation of each functional block and detecting anomaly in the operation of each functional block. Hereinafter, a function implemented by each functional block in the driver IC 6 may simply be referred to as a "function".

The state monitor 61 includes state monitors such as a gate driver state monitor 611, a VSYNC state monitor 612, an HSYNC state monitor 613, an internal power supply voltage state monitor 614, an input CLK state monitor 615, a source output state monitor 616, and a signal polarity reverse state monitor 61n.

The gate driver state monitor 611 monitors, for example, whether the operation of the gate driver is normal.

The VSYNC state monitor 612 monitors, for example, whether a VSYNC signal input to the display control circuit is normal.

The HSYNC state monitor 613 monitors, for example, whether an HSYNC signal input to the display control circuit is normal.

The internal power supply voltage state monitor 614 monitors, for example, whether a value of a voltage that is input to the voltage generation circuit and a value of a power supply voltage that is generated in the voltage generation circuit and to be used in the driver IC 6 are normal.

The input CLK state monitor 615 monitors, for example, whether a clock signal input to the display control circuit is normal.

The source output state monitor 616 monitors, for example, whether the source signal output from the source driver is normal.

The signal polarity reverse state monitor 61n monitors, for example, whether a common voltage that is reversed on a horizontal period basis is normal.

The state monitors 611, . . . , and 61n respectively output state monitoring signals ERTSIG1, . . . , and ERTSIGn each of which indicates whether a corresponding function is normal. Hereinafter, the state monitors 611, . . . , and 61n are collectively called "a plurality of state monitors 61", and the state monitoring signals ERTSIG1, . . . , and ERTSIGn are collectively called "state monitoring signals ERTSIG".

The state monitoring signal ERTSIG according to the present embodiment is a binary ("L" or "H") rectangular wave signal. Each of the state monitors 61 outputs the state monitoring signal ERTSIG to be "L" when a corresponding function as a monitoring target is normal. Each of the state monitors 61 outputs the state monitoring signal ERTSIG to be "H" when a corresponding function as a monitoring target is abnormal.

Returning to FIGS. 2 and 3, the anomaly determination circuit (MASTER) 62 receives an anomaly detection signal ERRDET (SLAVE) from the anomaly determination circuit (SLAVE) 62 through a BRSI terminal of the driver IC (MASTER) 6, and receives a plurality of state monitoring signals ERTSIG from the state monitors (MASTER) 61. In the present embodiment, the anomaly detection signal ERRDET is a binary ("L" or "H") rectangular wave signal.

Similarly, the anomaly determination circuit (SLAVE) 62 receives the anomaly detection signal ERRDET (MASTER) from the anomaly determination circuit (MASTER) 62 through the BRSI terminal of the driver IC (SLAVE) 6, and receives a plurality of state monitoring signals ERTSIG from the state monitors (SLAVE) 61.

The anomaly determination circuit 62 performs anomaly determination on each function of the driver IC 6 based on the state monitoring signals ERTSIG input from the state monitors 61, for example, a gate driver monitoring signal ERTSIG1 from the gate driver state monitor 611, a VSYNC signal monitoring signal ERTSIG2 from the VSYNC state monitor 612, an HSYNC signal monitoring signal ERTSIG3 from the HSYNC state monitor 613, an internal power supply voltage monitoring signal ERTSIG4 from the internal power supply voltage state monitor 614, a clock signal monitoring signal ERTSIG5 from the input CLK state monitor 615, a source signal monitoring signal ERTSIG6 from the source output state monitor 616, and a monitoring signal ERTSIGn from the signal polarity reverse state monitor 61n.

The anomaly determination circuit (SLAVE) 62 performs anomaly determination on each function of the driver IC (SLAVE) 6 based on the state monitoring signals ERTSIG input from the state monitor (SLAVE) 61, and outputs the anomaly detection signal ERRDET (SLAVE) as the anomaly determination result (second anomaly determination result) from a BRSO terminal of the driver IC (SLAVE) 6 to a BRSI terminal of the driver IC (MASTER) 6. In other words, the second anomaly determination result is a result of the anomaly determination performed on the functions of the driver IC (SLAVE) 6. The functions of the driver IC (SLAVE) 6 on which the anomaly determination is performed may be functional blocks, such as the gate driver, the source driver, the display control circuit, and the voltage generation circuit. When detecting that one or more of the functions of the driver IC (SLAVE) 6 are abnormal, the anomaly determination circuit (SLAVE) 62 outputs the anomaly detection signal ERRDET (SLAVE) to be "L".

On the other hand, the anomaly determination circuit (MASTER) 62 performs anomaly determination on the functions of the driver IC (MASTER) 6 based on the state monitoring signals ERTSIG input from the state monitor (MASTER) 61. The functions of the driver IC (MASTER) 6 on which the anomaly determination is performed may be included in functional blocks, such as the gate driver, the source driver, the display control circuit, and the voltage generation circuit. The anomaly determination circuit (MASTER) 62 performs anomaly determination on each function of the driver IC (MASTER) 6 and the driver IC (SLAVE) 6, that is, all functions of the semiconductor apparatus 5, based on the above anomaly determination result (first anomaly determination result) and the second anomaly determination result obtained by the anomaly determination circuit (SLAVE) 62, that is, As described above, the second anomaly determination result corresponds to the anomaly detection signal ERRDET (SLAVE) that is input to the BRSI terminal of the driver IC (MASTER) 6. The driver IC (MASTER) 6 outputs the anomaly detection signal ERRDET (MASTER) as the anomaly determination result (third anomaly determination result) that is obtained based on the first and second anomaly determination results. In other words, the first anomaly determination result is a result of the anomaly determination performed on the functions of the driver IC (MASTER) 6, and the third anomaly determination result is a result of the anomaly determination performed on all the functions of the driver ICs 6. When detecting that one or more of the functions of the driver IC (MASTER) 6 and the functions of the driver IC (SLAVE) 6 are abnormal, the anomaly determination circuit (MASTER) 62 outputs the anomaly detection signal ERRDET (MASTER) to be "L".

The anomaly determination circuit (MASTER) 62 outputs the anomaly detection signal ERRDET (MASTER) to the anomaly processor (MASTER) 63 as the anomaly processing request signal REQ for the anomaly processor (MASTER) 63.

On the other hand, the anomaly determination circuit (SLAVE) 62 outputs the anomaly detection signal ERRDET (MASTER), as the anomaly processing request signal REQ for the anomaly processor (SLAVE) 63, to the anomaly processor (SLAVE) 63 via the BRSO terminal of the driver IC (MASTER) 6.

That is, the anomaly processing request signal REQ for the anomaly processor (MASTER) 63 and the anomaly processing request signal REQ for the anomaly processor (SLAVE) 63 are binary ("L" or "H") rectangular wave signals indicating substantially the same logic.

The anomaly detection signal ERRDET (MASTER) is also output to the host controller 2. The host controller 2 detects that the anomaly detection signal ERRDET (MASTER) is "L", and performs predetermined processing. For example, when detecting the anomaly detection signal ERRDET (MASTER) "L" multiple times, the host controller 2 may perform predetermined processing such as forcibly resetting the driver 3 or causing the driver 3 to be unable to be started assuming that the state is not returned to be normal through the anomaly processing performed by the anomaly processor 63.

Figure 5:
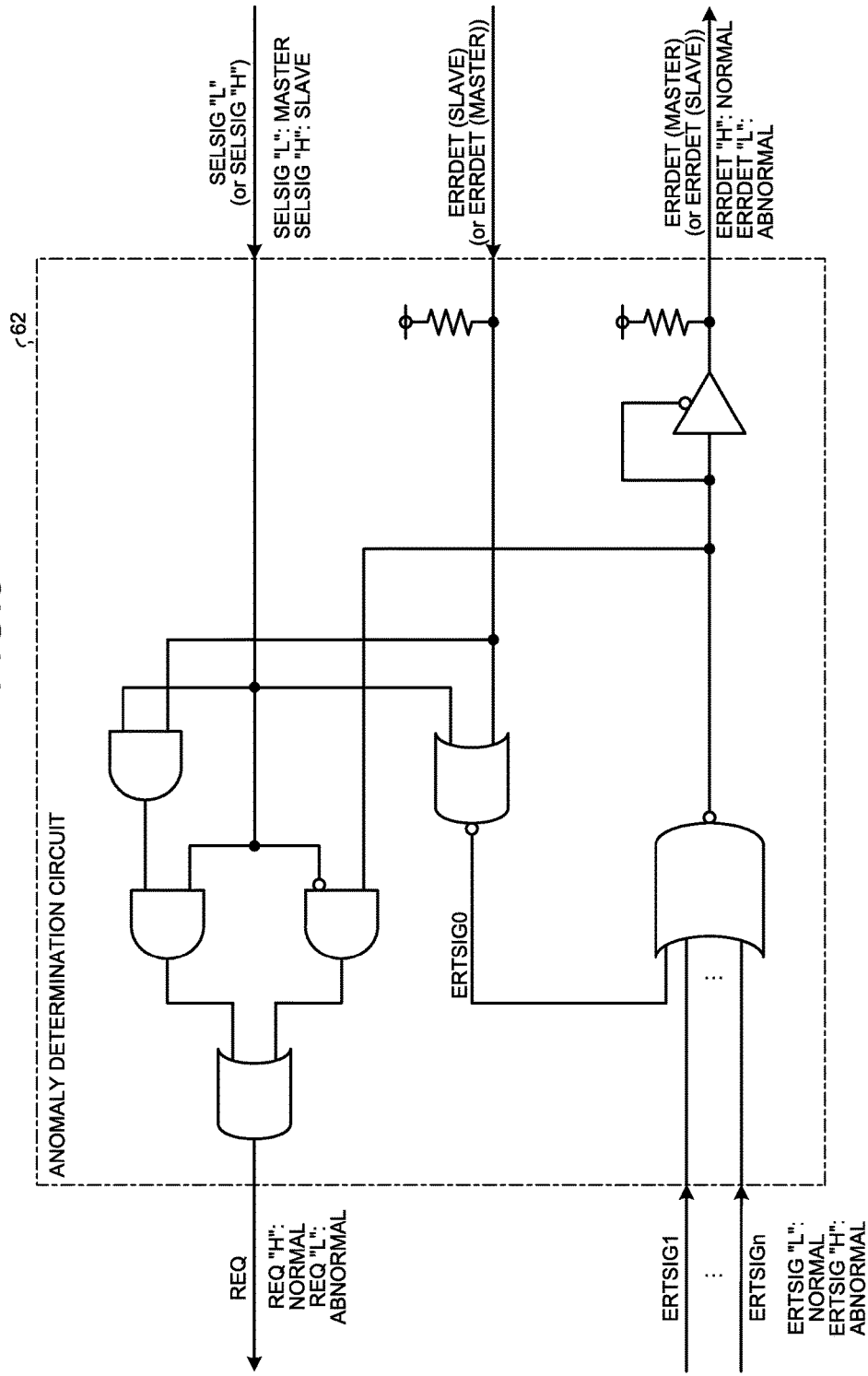
FIG. 5 is a diagram illustrating an example of an internal logic configuration of an anomaly determination circuit of the driver IC included in the semiconductor apparatus according to the first embodiment.
Figure 6:
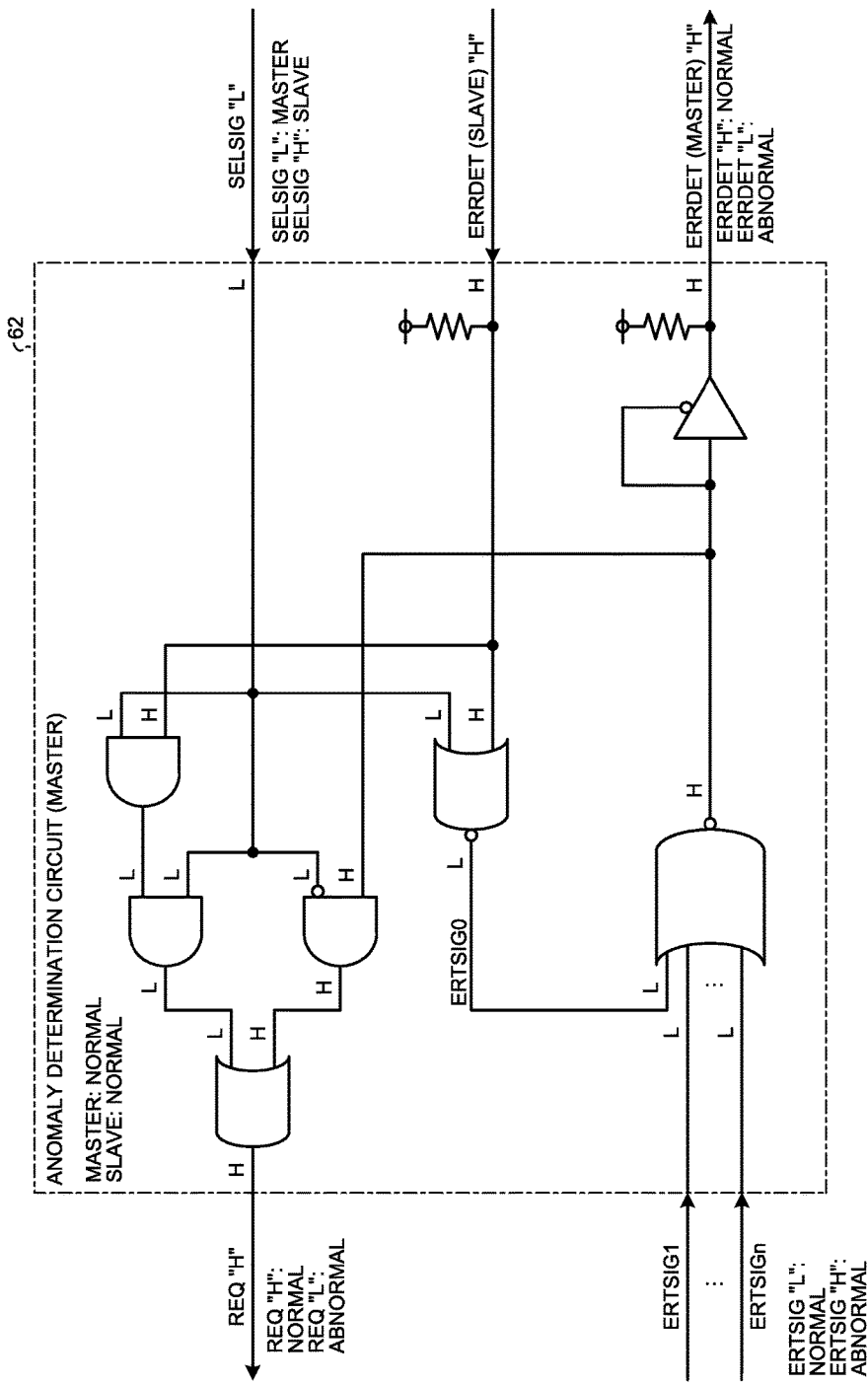
FIG. 6 is a diagram illustrating a state of logic in each part of an anomaly determination circuit (MASTER) in a case in which all functions are normal in a driver IC (MASTER) and a driver IC (SLAVE)
Figure 7:
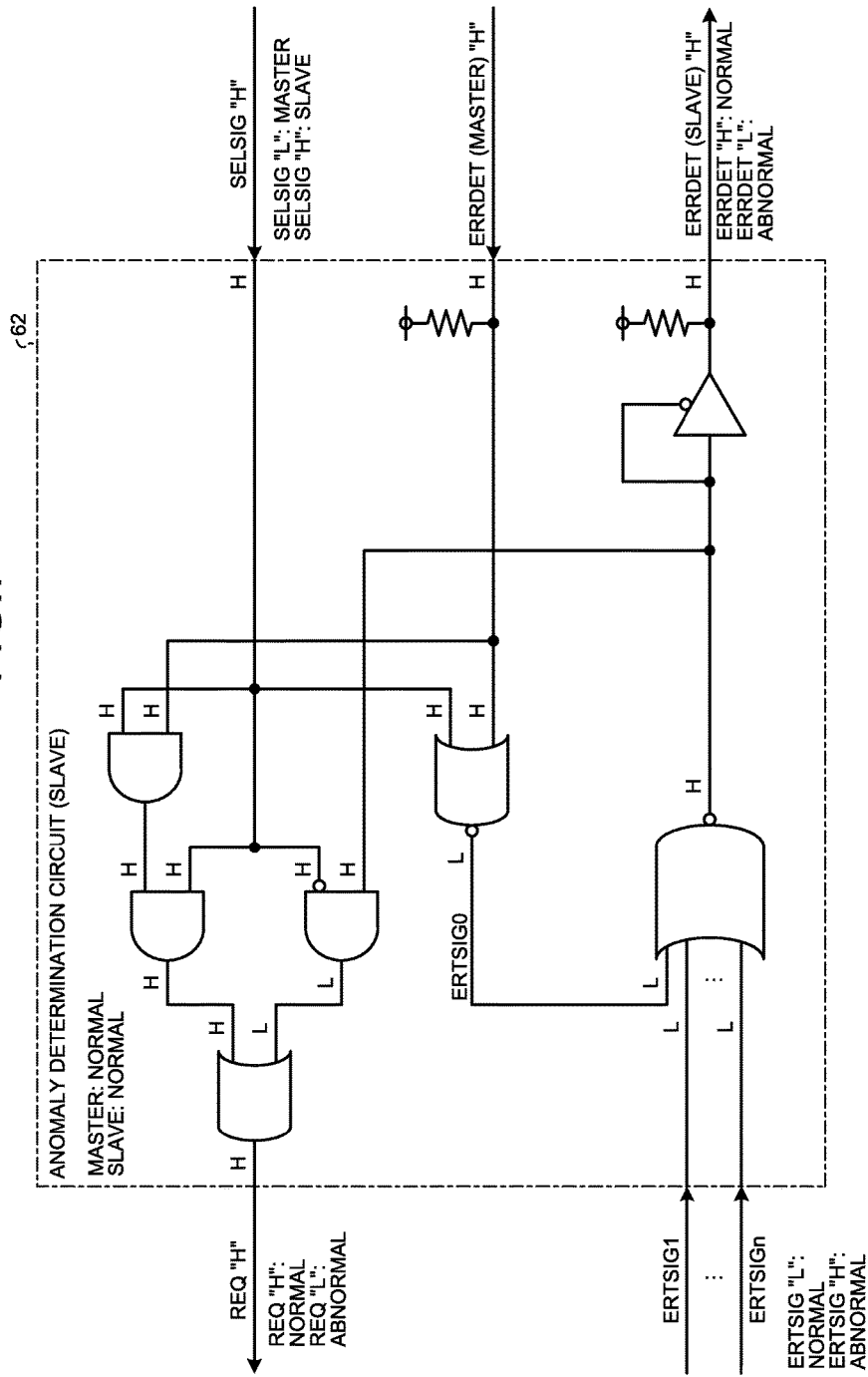
FIG. 7 is a diagram illustrating a state of logic in each part of an anomaly determination circuit (SLAVE) in a case in which all functions are normal in the driver IC (MASTER) and the driver IC (SLAVE)
Figure 8:
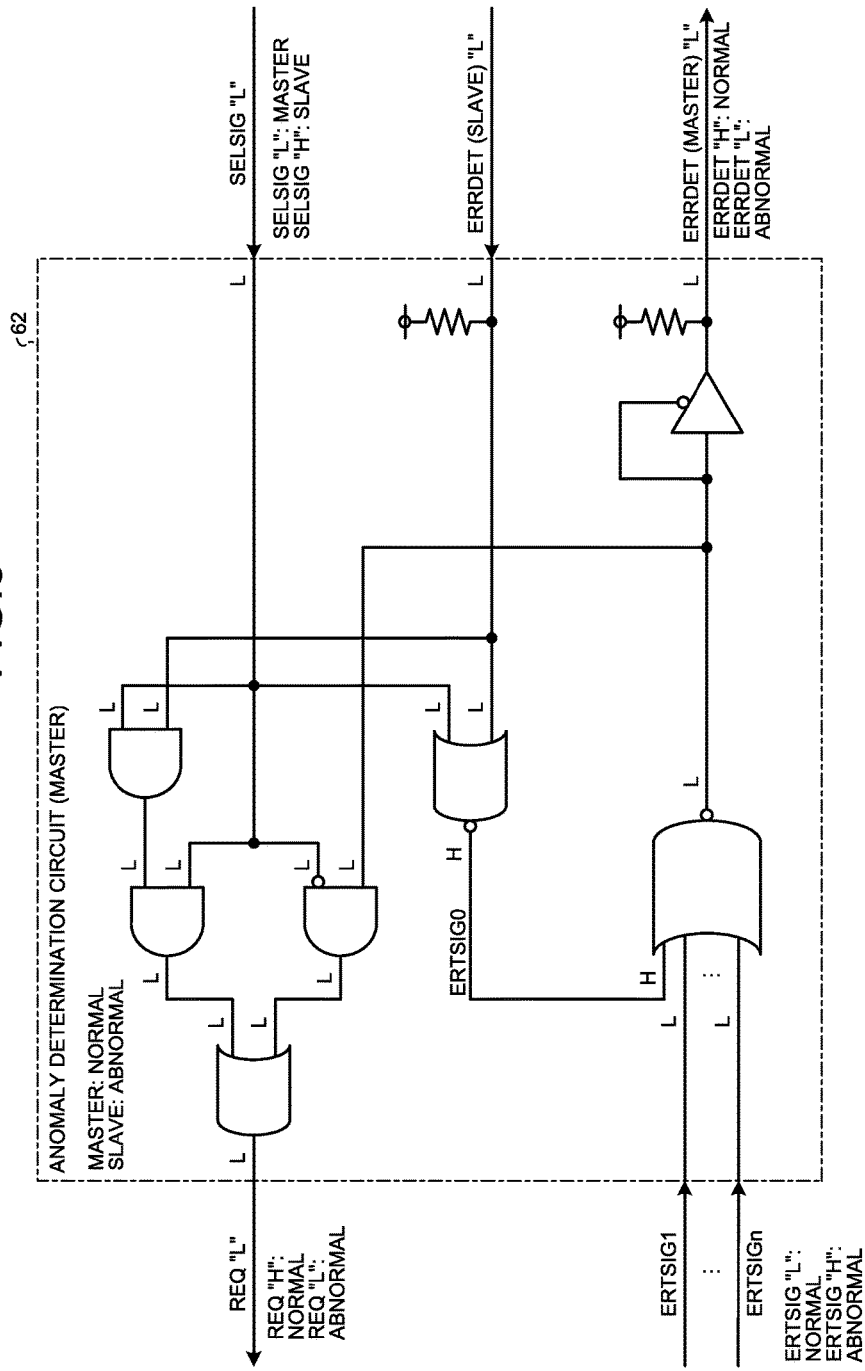
FIG. 8 is a diagram illustrating a state of logic in each part of the anomaly determination circuit (MASTER) in a case in which all functions are normal in the driver IC (MASTER) and one or more functions are abnormal in the driver IC (SLAVE)
Figure 9:
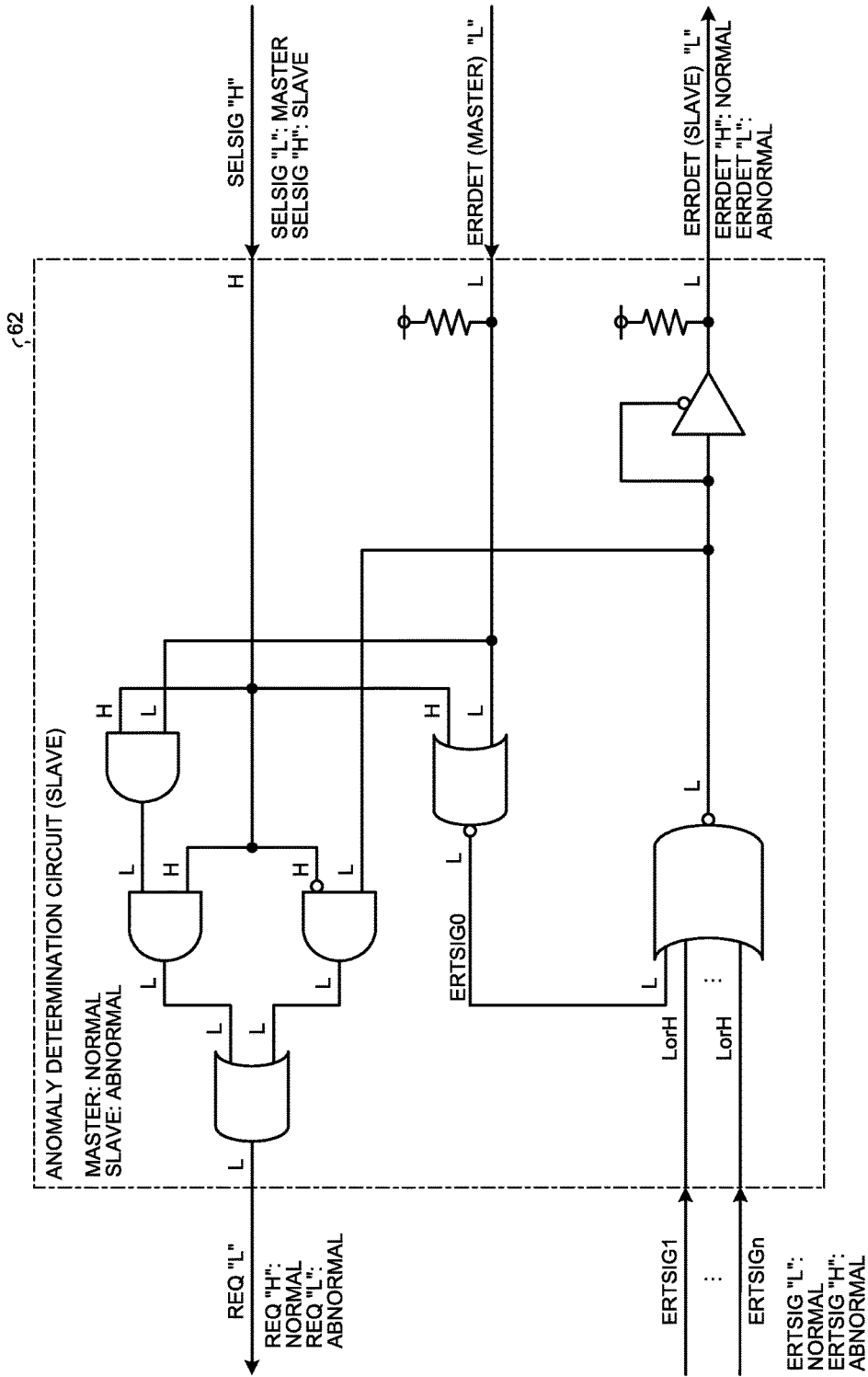
FIG. 9 is a diagram illustrating a state of logic in each part of the anomaly determination circuit (SLAVE) in a case in which all functions are normal in the driver IC (MASTER) and one or more functions are abnormal in the driver IC (SLAVE)
Figure 10:
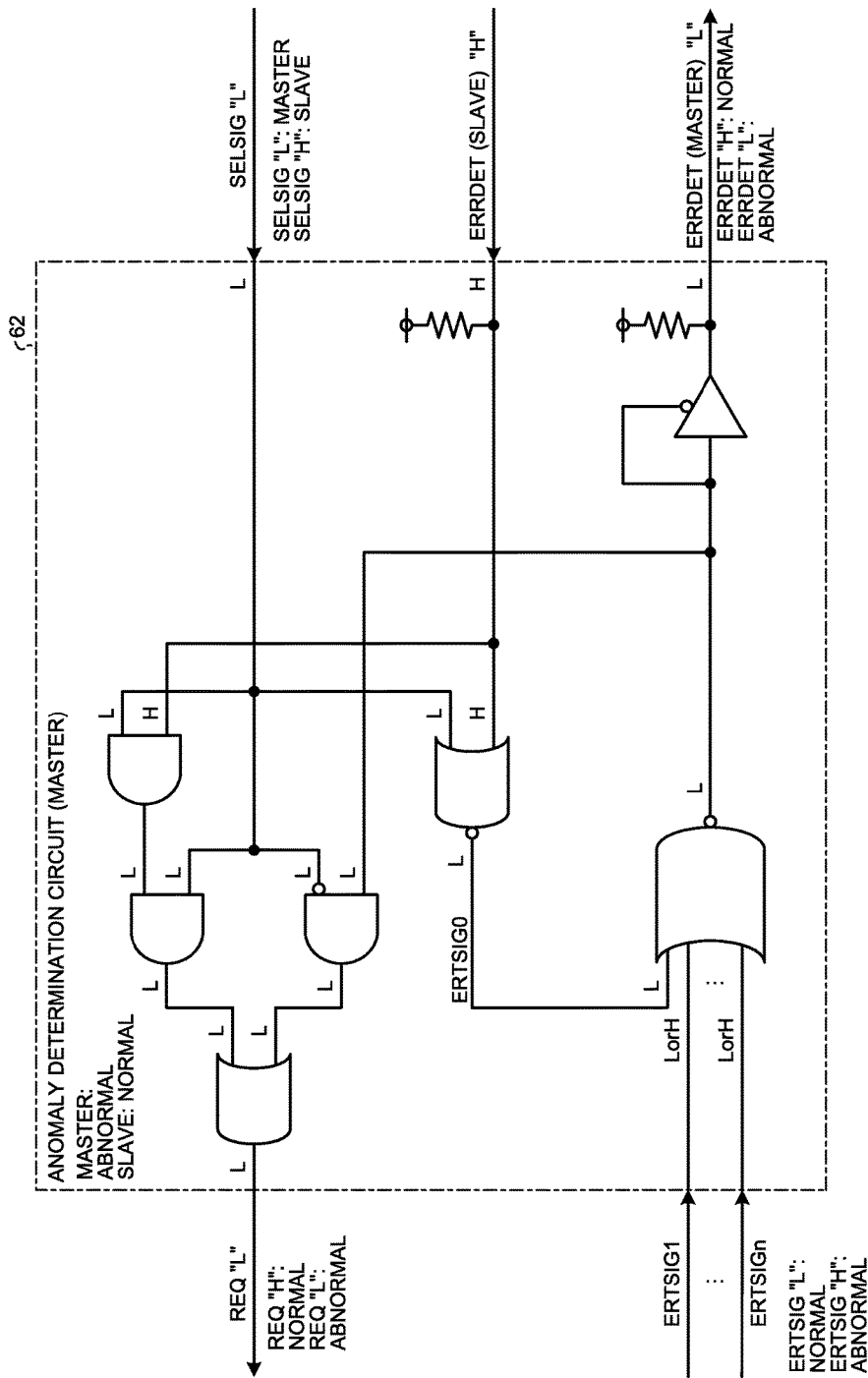
FIG. 10 is a diagram illustrating a state of logic in each part of the anomaly determination circuit (MASTER) in a case in which one or more functions are abnormal in the driver IC (MASTER) and all functions are normal in the driver IC (SLAVE)
Figure 11:
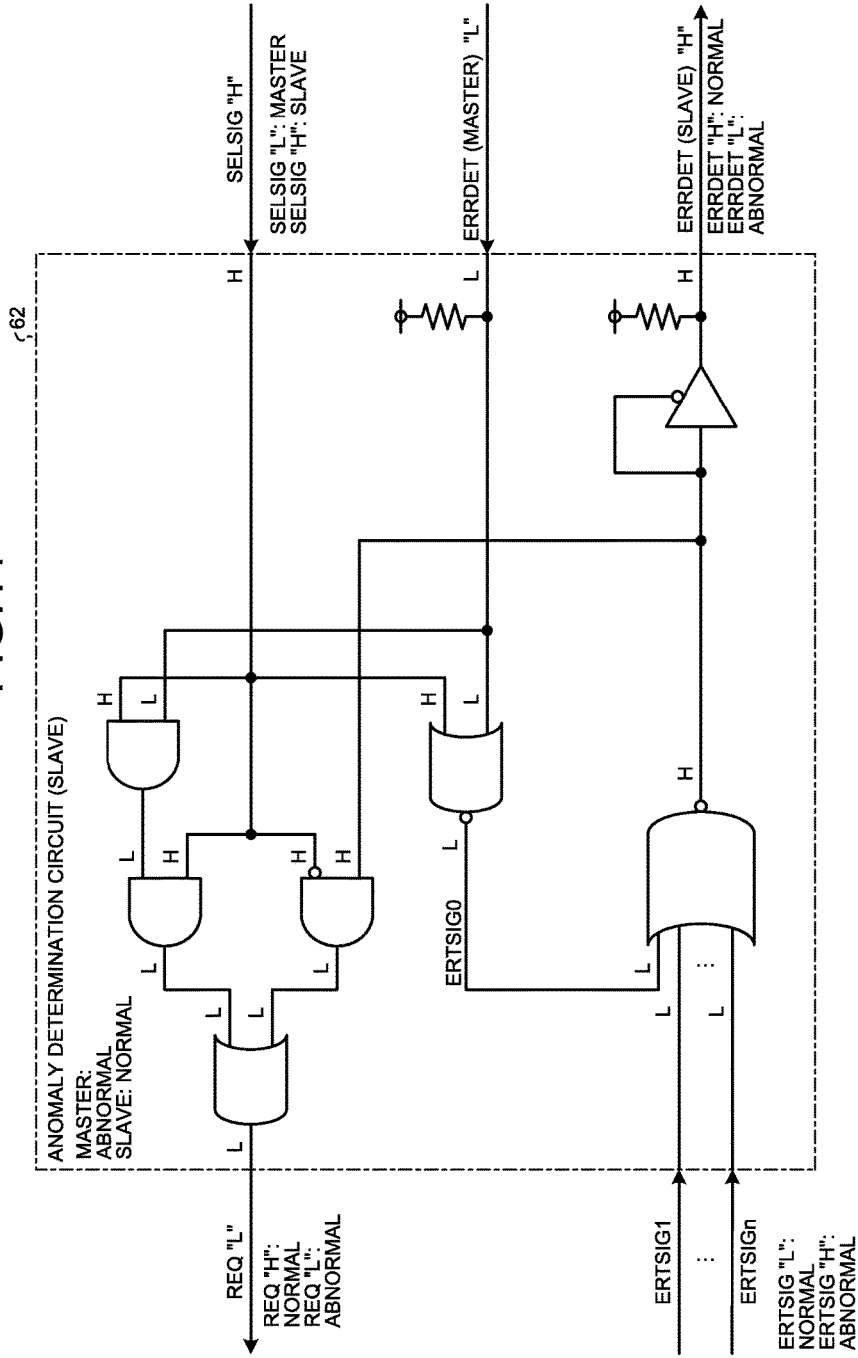
FIG. 11 is a diagram illustrating a state of logic in each part of the anomaly determination circuit (SLAVE) in a case in which one or more functions are abnormal in the driver IC (MASTER) and all functions are normal in the driver IC (SLAVE)
Figure 12:
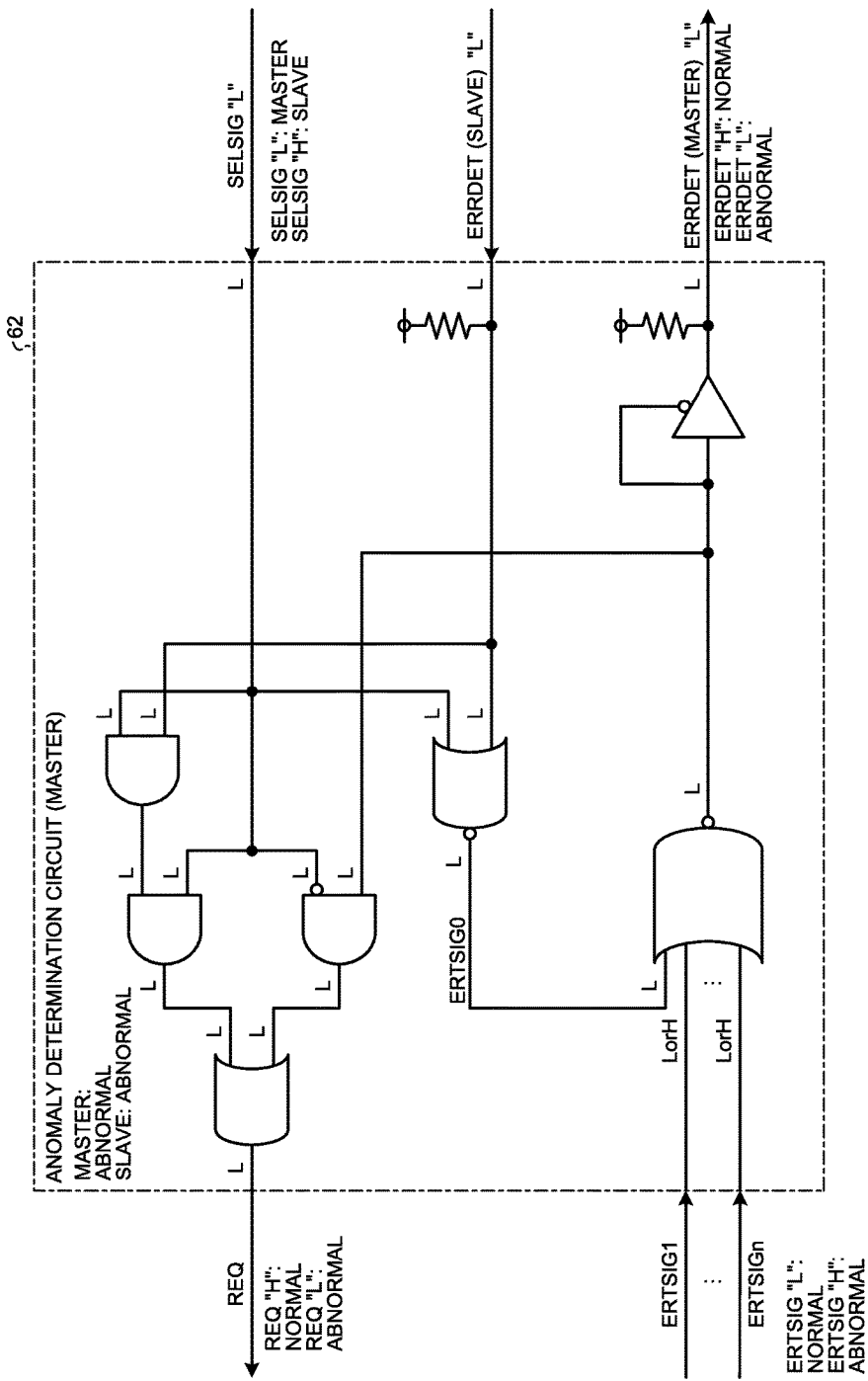
FIG. 12 is a diagram illustrating a state of logic in each part of the anomaly determination circuit (MASTER) in a case in which one or more functions are abnormal in the driver IC (MASTER) and one or more functions are abnormal in the driver IC (SLAVE)
Figure 13:
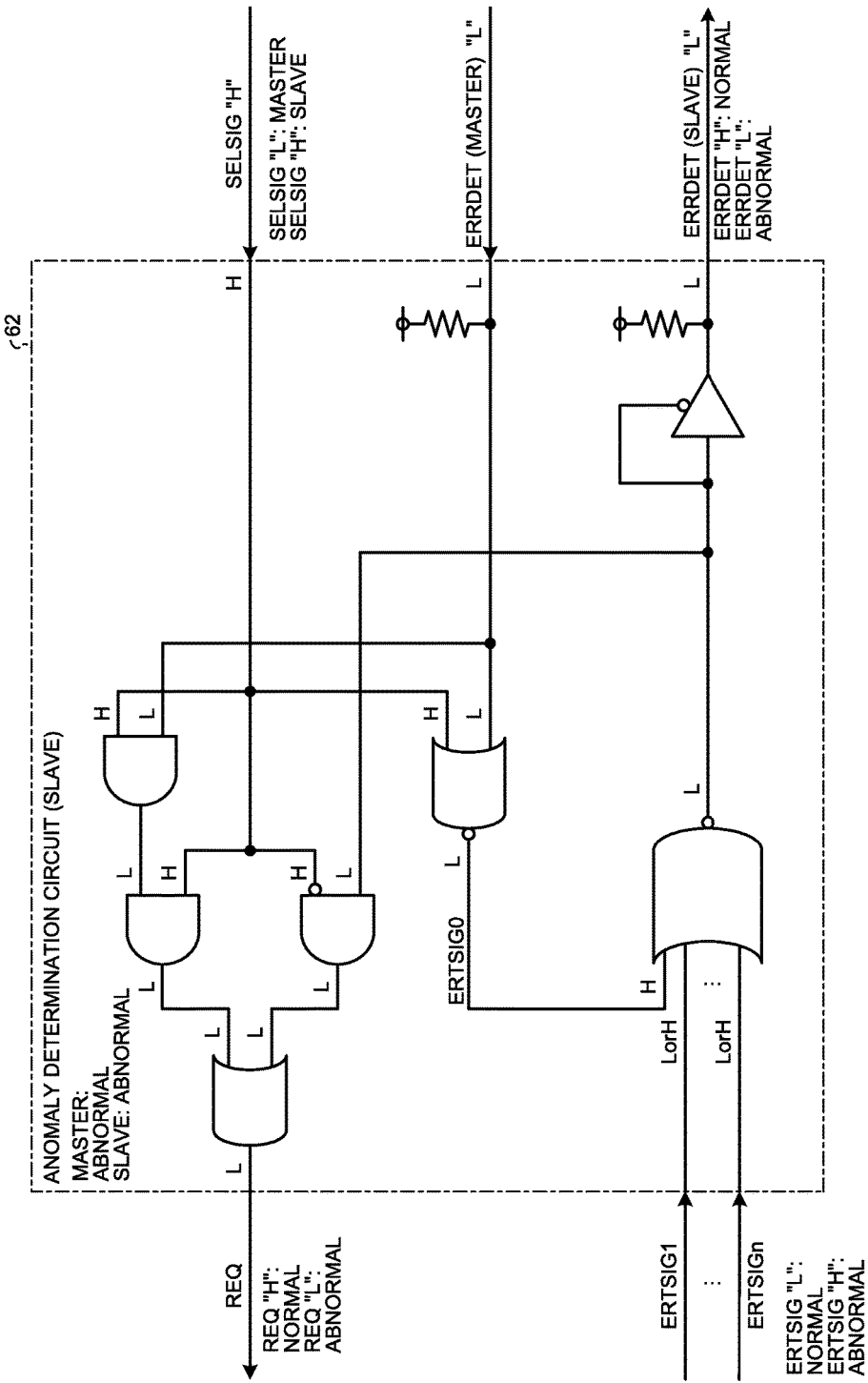
FIG. 13 is a diagram illustrating a state of logic in each part of the anomaly determination circuit (SLAVE) in a case in which one or more functions are abnormal in the driver IC (MASTER) and one or more functions are abnormal in the driver IC (SLAVE)

FIG. 5 is a diagram illustrating an example of an internal logic configuration of the anomaly determination circuit of the driver IC included in the semiconductor apparatus according to the first embodiment. FIG. 6 is a diagram illustrating a state of logic in each part of the anomaly determination circuit (MASTER) in a case in which all functions are normal in the driver IC (MASTER) and the driver IC (SLAVE). FIG. 7 is a diagram illustrating a state of logic in each part of the anomaly determination circuit (SLAVE) in a case in which all functions are normal in the driver IC (MASTER) and the driver IC (SLAVE). FIG. 8 is a diagram illustrating a state of logic in each part of the anomaly determination circuit (MASTER) in a case in which all functions are normal in the driver IC (MASTER) and one or more functions are abnormal in the driver IC (SLAVE). FIG. 9 is a diagram illustrating a state of logic in each part of the anomaly determination circuit (SLAVE) in a case in which all functions are normal in the driver IC (MASTER) and one or more functions are abnormal in the driver IC (SLAVE). FIG. 10 is a diagram illustrating a state of logic in each part of the anomaly determination circuit (MASTER) in a case in which one or more functions are abnormal in the driver IC (MASTER) and all functions are normal in the driver IC (SLAVE). FIG. 11 is a diagram illustrating a state of logic in each part of the anomaly determination circuit (SLAVE) in a case in which one or more functions are abnormal in the driver IC (MASTER) and all functions are normal in the driver IC (SLAVE). FIG. 12 is a diagram illustrating a state of logic in each part of the anomaly determination circuit (MASTER) in a case in which one or more functions are abnormal in the driver IC (MASTER) and one or more functions are abnormal in the driver IC (SLAVE). FIG. 13 is a diagram illustrating a state of logic in each part of the anomaly determination circuit (SLAVE) in a case in which one or more functions are abnormal in the driver IC (MASTER) and one or more functions are abnormal in the driver IC (SLAVE).

In the internal logic configuration of the anomaly determination circuit 62 illustrated in FIG. 5, when all the functions in the driver IC (MASTER) 6 and the driver IC (SLAVE) 6 are normal, that is, when all of the state monitoring signals ERTSIG1, . . . , and ERTSIGn of the driver IC (MASTER) 6 and the state monitoring signals ERTSIG1, . . . , and ERTSIGn of the driver IC (SLAVE) 6 are "L", the anomaly processing request signal REQ for the anomaly processor (MASTER) 63 and the anomaly processing request signal REQ for the anomaly processor (SLAVE) 63 are "H" (refer to FIGS. 6 and 7).

In the internal logic configuration of the anomaly determination circuit 62 illustrated in FIG. 5, when all the functions in the driver IC (MASTER) 6 are normal, that is, all the state monitoring signals ERTSIG1, . . . , and ERTSIGn of the driver IC (MASTER) 6 are "L", and one or more functions in the driver IC (SLAVE) 6 are abnormal, that is, one or more of the state monitoring signals ERTSIG1, . . . , and ERTSIGn are "H" of the driver IC (SLAVE) 6, the anomaly processing request signal REQ for the anomaly processor (MASTER) 63 and the anomaly processing request signal REQ for the anomaly processor (SLAVE) 63 are "L" (refer to FIGS. 8 and 9).

In the internal logic configuration of the anomaly determination circuit 62 illustrated in FIG. 5, when one or more functions in the driver IC (MASTER) 6 are abnormal, that is, one or more of the state monitoring signals ERTSIG1, . . . , and ERTSIGn of the driver IC (MASTER) 6 are "H", and all the functions in the driver IC (SLAVE) 6 are normal, that is, all of the state monitoring signals ERTSIG1, . . . , and ERTSIGn of the driver IC (SLAVE) 6 are "L", the anomaly processing request signal REQ for the anomaly processor (MASTER) 63 and the anomaly processing request signal REQ for the anomaly processor (SLAVE) 63 are "L" (refer to FIGS. 10 and 11).

In the internal logic configuration of the anomaly determination circuit 62 illustrated in FIG. 5, when one or more functions in the driver IC (MASTER) 6 and the driver IC (SLAVE) 6 are abnormal, that is, when one or more of the state monitoring signals ERTSIG1, . . . , and ERTSIGn of the driver IC (MASTER) 6 and the state monitoring signals ERTSIG1, . . . , and ERTSIGn of the driver IC (SLAVE) 6 are "H", the anomaly processing request signal REQ for the anomaly processor (MASTER) 63 and the anomaly processing request signal REQ for the anomaly processor (SLAVE) 63 are "L" (refer to FIGS. 12 and 13).

In this way, in the semiconductor apparatus 5 according to the present embodiment, the anomaly determination circuit (SLAVE) 62 of the driver IC (SLAVE) 6 set as the slave device outputs the anomaly detection signal ERRDET (SLAVE) to the anomaly determination circuit (MASTER) 62 of the driver IC (MASTER) 6 set as the master device. The anomaly detection signal ERRDET (SLAVE) is a signal as the second anomaly determination result based on the state monitoring signals ERTSIG input from the state monitor (SLAVE) 61. The anomaly determination circuit (MASTER) 62 performs anomaly determination on each function of the driver IC (MASTER) 6 and the driver IC (SLAVE) 6, that is, all the functions of the semiconductor apparatus 5 based on the first anomaly determination result and the second anomaly determination result, and outputs the anomaly detection signal ERRDET (MASTER). The first anomaly determination result is a result based on the state monitoring signals ERTSIG input from the state monitor (MASTER) 61, and the second anomaly determination result is obtained by the anomaly determination circuit (SLAVE) 62 and corresponds to the anomaly detection signal ERRDET (SLAVE). Then the anomaly determination circuit (MASTER) 62 outputs the anomaly detection signal ERRDET (MASTER) to the anomaly processor (MASTER) 63 as the anomaly processing request signal REQ for the anomaly processor (MASTER) 63, and the anomaly determination circuit (SLAVE) 62 outputs the anomaly detection signal ERRDET (MASTER) to the anomaly processor (SLAVE) 63 as the anomaly processing request signal REQ for the anomaly processor (SLAVE) 63.

Accordingly, in the semiconductor apparatus 5 including a plurality of driver ICs 6, even when anomaly occurs in a function of any one of the driver ICs 6, anomaly processing can be performed on the driver ICs 6 at the same time, and mismatching among the driver ICs 6 caused by malfunction in the driver IC (MASTER) 6 or the driver IC (SLAVE) 6 can be resolved.

The internal logic configuration of the anomaly determination circuit 62 in the driver IC 6 included in the semiconductor apparatus 5 according to the first embodiment is not limited to the configuration illustrated in FIGS. 5 to 13. Any internal logic configuration may be used so long as the anomaly processing request signal REQ for the anomaly processor (MASTER) 63 and the anomaly processing request signal REQ for the anomaly processor (SLAVE) 63 have substantially the same logic. The present invention is not limited to the internal logic configuration of the anomaly determination circuit 62 in the driver IC 6 included in the semiconductor apparatus 5.

Figure 14:
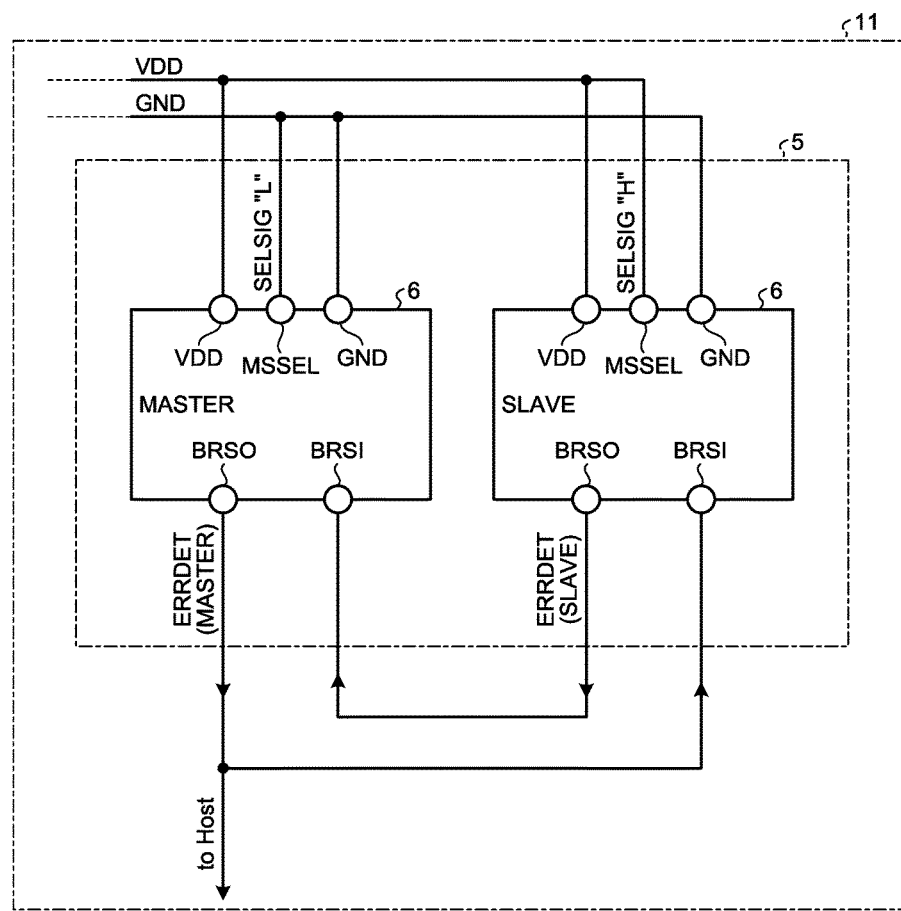
FIG. 14 is a diagram illustrating an example of an implementation form of the semiconductor apparatus according to the first embodiment.

FIG. 14 is a diagram illustrating an example of an implementation form of the semiconductor apparatus according to the first embodiment.

In the example illustrated in FIG. 14, the driver IC (MASTER) 6 and the driver IC (SLAVE) 6 included in the semiconductor apparatus 5 are arranged side by side on the glass substrate 11.

In the example illustrated in FIG. 14, the MSSEL terminal of the driver IC (MASTER) 6 is coupled to a GND terminal that applies GND potential to the driver IC 6, and the selection signal SELSIG "L" is applied to the MSSEL terminal of the driver IC (MASTER) 6. In the example illustrated in FIG. 14, the MSSEL terminal of the driver IC (SLAVE) 6 is coupled to a VDD terminal that supplies a VDD power supply to the driver IC 6, and the selection signal SELSIG "H" is applied to the MSSEL terminal of the driver IC (SLAVE) 6.

The embodiment is not limited to the configuration of applying the selection signal SELSIG "L" to the MSSEL terminal of the driver IC (MASTER) 6 and the configuration of applying the selection signal SELSIG "H" to the MSSEL terminal of the driver IC (SLAVE) 6. For example, a configuration in which the host controller (Host) 2 applies the selection signal SELSIG "L" to the MSSEL terminal of the driver IC (MASTER) 6 may be employed, and similarly, a configuration in which the host controller (Host) 2 applies the selection signal SELSIG "H" to the MSSEL terminal of the driver IC (SLAVE) 6 may be employed.

In the exemplary configuration illustrated in FIG. 14, the anomaly detection signal ERRDET (MASTER) is supplied to the host controller (Host) 2. Additionally, the anomaly detection signal ERRDET (SLAVE) may be supplied to the host controller (Host). For example, the host controller (Host) 2 may supply the selection signal SELSIG to the MSSEL terminal of the driver IC (MASTER) 6 and the MSSEL terminal of the driver IC (SLAVE) 6, and the anomaly detection signal ERRDET (MASTER) and the anomaly detection signal ERRDET (SLAVE) may be supplied to the host controller (Host) 2. With this configuration, the host controller (Host) 2 can individually set each of the driver ICs 6 as either a master device or a slave device. Accordingly, flexibility of hardware design such as substrate design can be improved.

Figure 15:
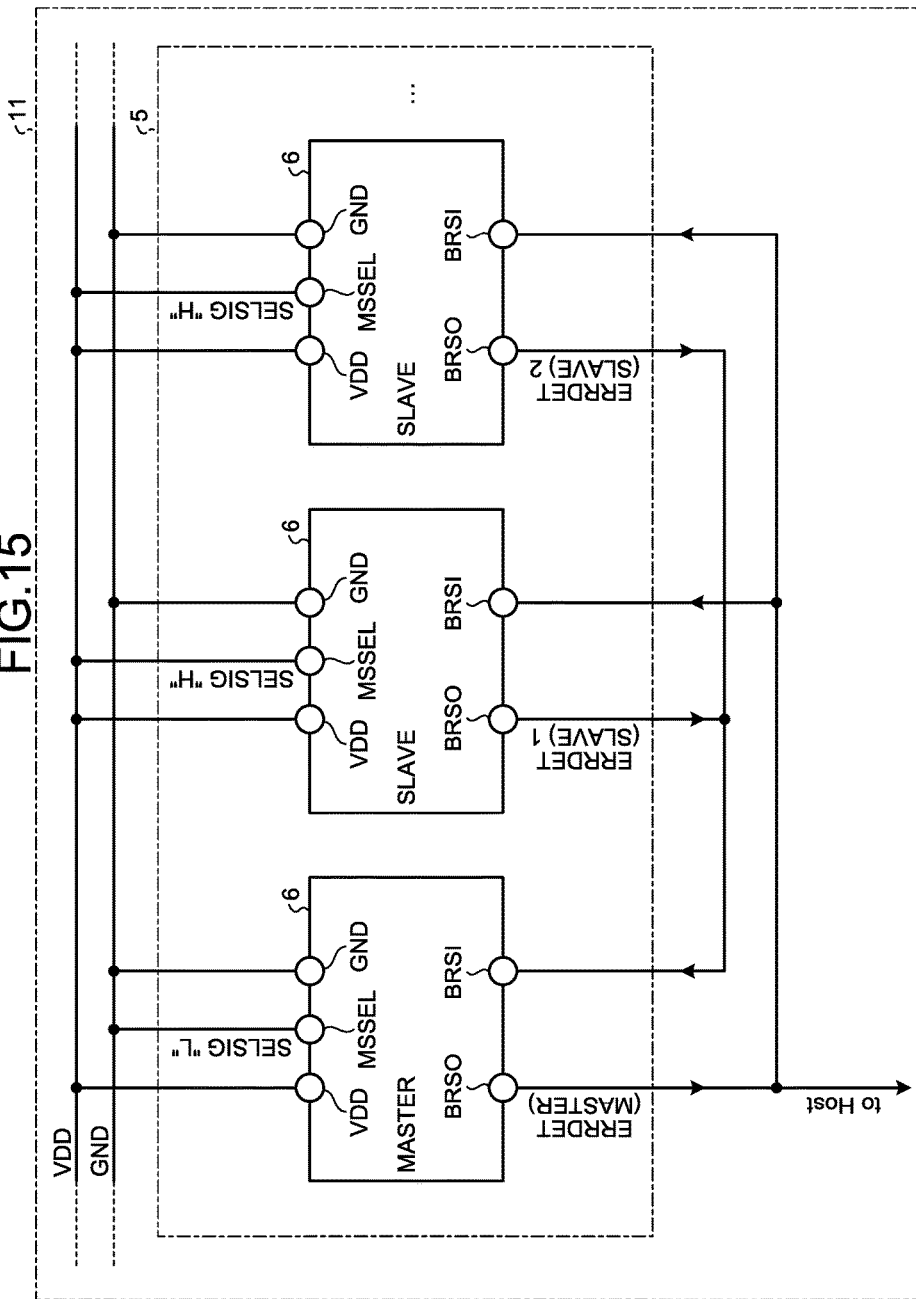
FIG. 15 is a diagram illustrating an example of an implementation form in a case in which two or more driver ICs (SLAVE) included in the semiconductor apparatus according to the first embodiment are arranged.

FIG. 15 is a diagram illustrating an example of an implementation form in a case in which two or more driver ICs (SLAVE) included in the semiconductor apparatus according to the first embodiment are arranged.

The semiconductor apparatus 5 according to the present embodiment may include two or more driver ICs (SLAVE) 6 as illustrated in FIG. 15. Thus, for example, the semiconductor apparatus 5 that can be applied to a display apparatus having high resolution of 4K or more can be obtained without changing a type of the driver IC 6.

Figure 16:
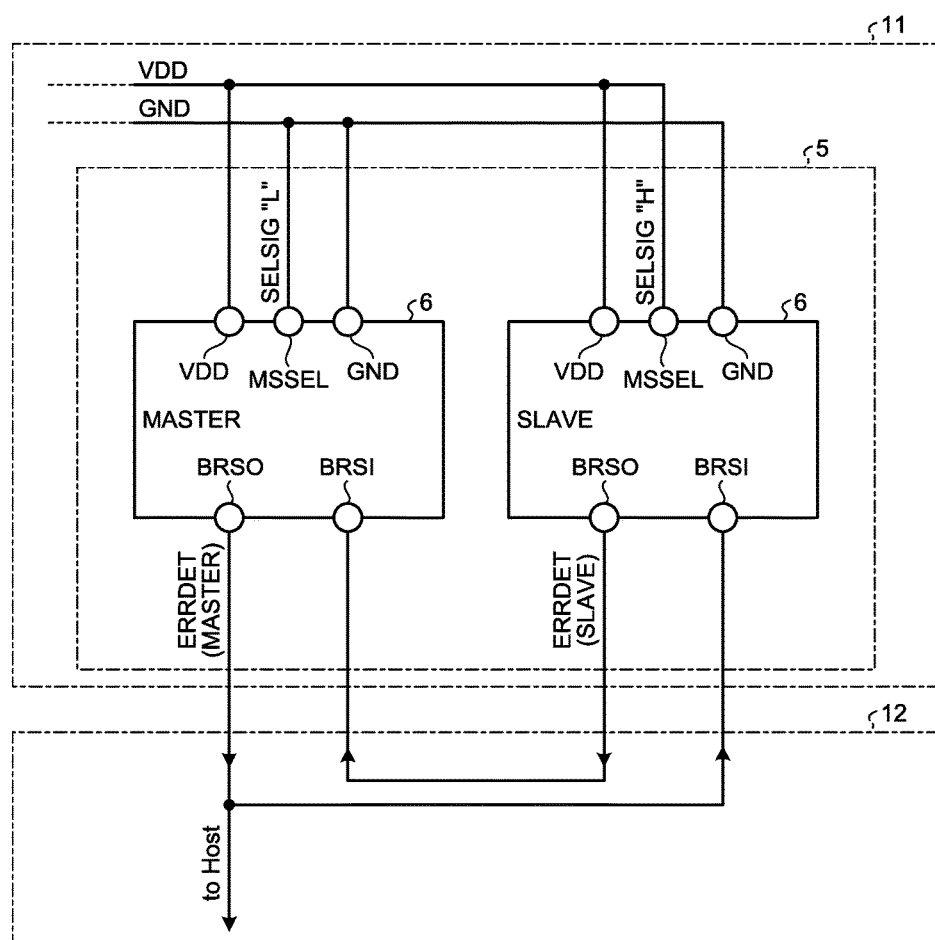
FIG. 16 is a diagram illustrating an example in which a BRSO terminal and a BRSI terminal between the driver IC (MASTER) and the driver IC (SLAVE) of the semiconductor apparatus according to the first embodiment are coupled to each other on a relay substrate.

FIG. 16 is a diagram illustrating an example in which the BRSO terminal and the BRSI terminal between the driver IC (MASTER) and the driver IC (SLAVE) of the semiconductor apparatus according to the first embodiment are coupled to each other on the relay substrate.

As illustrated in FIG. 16, when the BRSO terminal and the BRSI terminal between the driver IC (MASTER) 6 and the driver IC (SLAVE) 6 are coupled to each other on the relay substrate 12, such as a flexible printed circuit (FPC), a wiring area on the glass substrate 11 can be reduced, which contributes to downsizing of the display apparatus 1.

Figure 17:
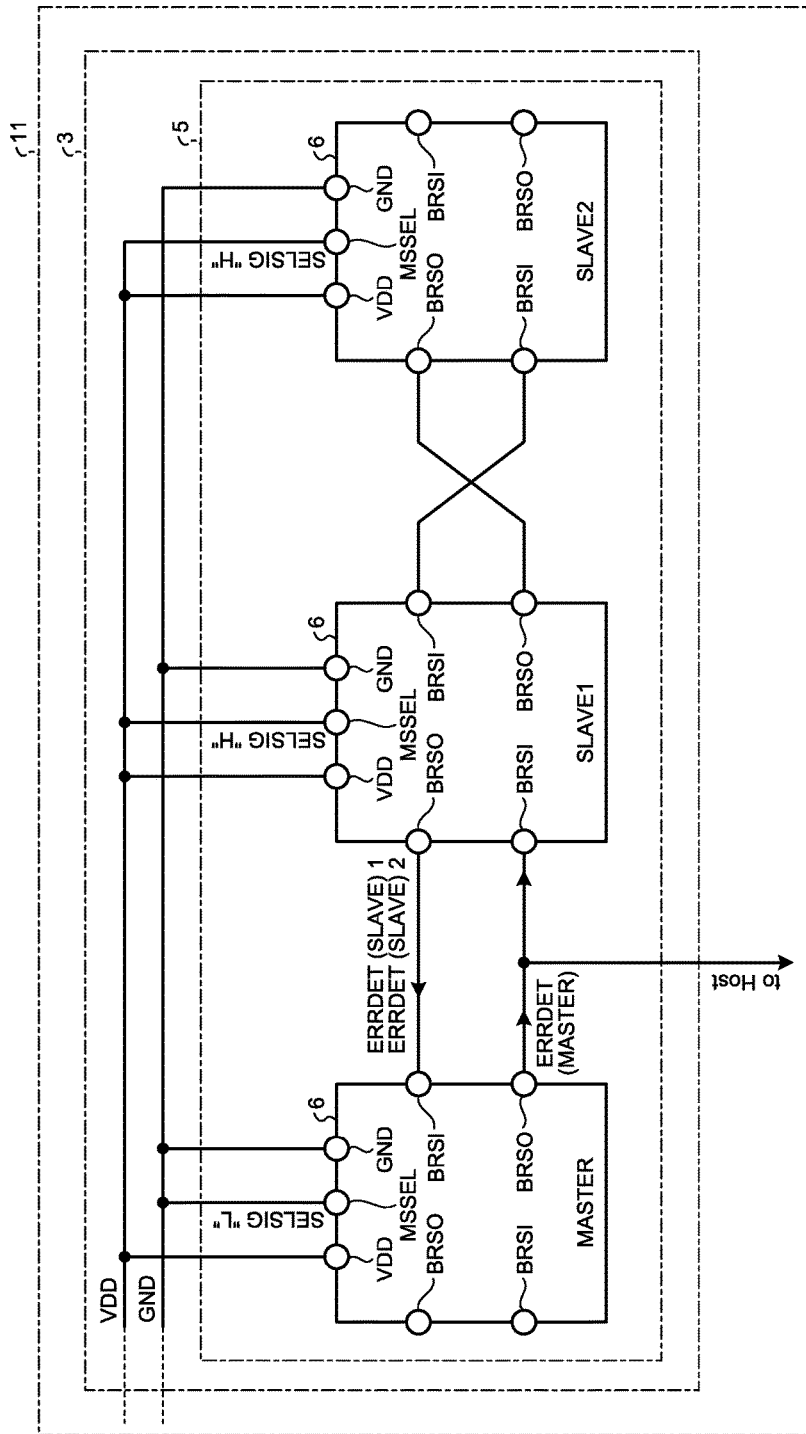
FIG. 17 is a diagram illustrating an example in which the BRSO terminal and the BRSI terminal are provided on each of two opposite sides of the driver IC of the semiconductor apparatus according to the first embodiment.

FIG. 17 is a diagram illustrating an example in which the BRSO terminal and the BRSI terminal are provided on each of two opposite sides of the driver IC of the semiconductor apparatus according to the first embodiment. In the example illustrated in FIG. 17, in the driver ICs 6, two BRSO terminals are coupled to each other between the two opposite sides, and similarly, two BRSI terminals are coupled to each other between the two opposite sides.

When the BRSO terminal and the BRSI terminal are provided on each of the two opposite sides of the driver IC 6 in a case in which a plurality of driver ICs 6 are arranged in a line on the glass substrate 11 as illustrated in FIG. 17, a wiring route between the BRSO terminal of the driver IC (MASTER) 6 and the BRSI terminal of the driver IC (SLAVE) 6, and a wiring route between BRSO terminals and between BRSI terminals of the driver ICs (SLAVE) 6 can be shortened, so that an area occupied by the driver 3 on the glass substrate 11 can be reduced, which contributes to downsizing of the display apparatus 1.

As described above, in the semiconductor apparatus 5 according to the first embodiment, the anomaly determination circuit (SLAVE) 62 of the driver IC (SLAVE) 6 set as the slave device outputs the anomaly detection signal ERRDET (SLAVE) to the anomaly determination circuit (MASTER) 62 of the driver IC (MASTER) 6 set as the master device. The anomaly detection signal ERRDET (SLAVE) is a signal as the second anomaly determination result based on the state monitoring signals ERTSIG input from the state monitor (SLAVE) 61. The anomaly determination circuit (MASTER) 62 performs anomaly determination on each function of the driver IC (MASTER) 6 and the driver IC (SLAVE) 6, that is, all the functions of the semiconductor apparatus 5 based on the first anomaly determination result and the second anomaly determination result, and outputs the anomaly detection signal ERRDET (MASTER). The first anomaly determination result is a result based on the state monitoring signals ERTSIG input from the state monitor (MASTER) 61, and the second anomaly determination result is obtained by the anomaly determination circuit (SLAVE) 62 and corresponds to the anomaly detection signal ERRDET (SLAVE). The anomaly determination circuit (MASTER) 62 outputs the anomaly detection signal ERRDET (MASTER) to the anomaly processor (MASTER) 63 as the anomaly processing request signal REQ for the anomaly processor (MASTER) 63, and the anomaly determination circuit (SLAVE) 62 outputs the anomaly detection signal ERRDET (MASTER) to the anomaly processor (SLAVE) 63 as the anomaly processing request signal REQ for the anomaly processor (SLAVE) 63.

Accordingly, in the semiconductor apparatus 5 including a plurality of driver ICs 6, even when anomaly occurs in a function of any one of the driver ICs 6, predetermined anomaly processing can be performed on the driver ICs 6 at the same time, and mismatching among the driver ICs 6 caused by malfunction in the driver IC (MASTER) 6 or the driver IC (SLAVE) 6 can be resolved.

According to the present embodiment, provided is the semiconductor apparatus 5 that can resolve mismatching among the driver ICs (semiconductor devices) 6 caused by malfunction in one or a plurality of driver ICs (semiconductor devices) 6.

Second Embodiment

Figure 18:
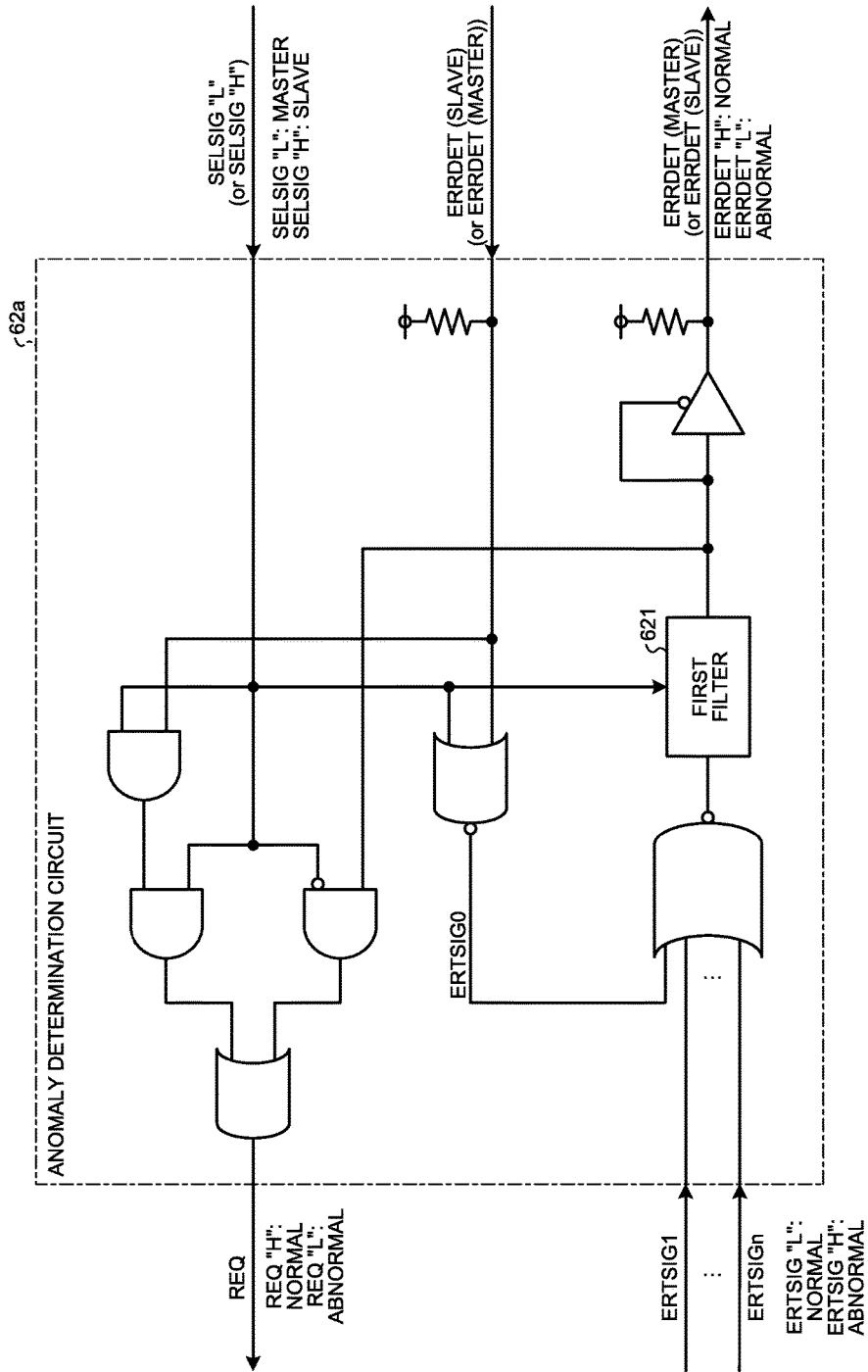
FIG. 18 is a diagram illustrating an example of an internal logic configuration of an anomaly determination circuit of a driver IC included in a semiconductor apparatus according to a second embodiment.

FIG. 18 is a diagram illustrating an example of the internal logic configuration of the anomaly determination circuit of the driver IC included in the semiconductor apparatus according to a second embodiment. A schematic configuration of the display system to which the semiconductor apparatus according to the second embodiment is applied, a block configuration of the display apparatus, an internal configuration of the driver IC, and the state monitor are the same as those in the first embodiment described above, so that redundant description will not be repeated.

As illustrated in FIG. 18, an anomaly determination circuit 62a of the driver IC 6 included in the semiconductor apparatus 5 according to the present embodiment includes, in addition to the configuration according to the first embodiment, a first filter 621 that passes the anomaly detection signal ERRDET (MASTER) therethrough when anomaly continues for a predetermined time.

Figure 19A:
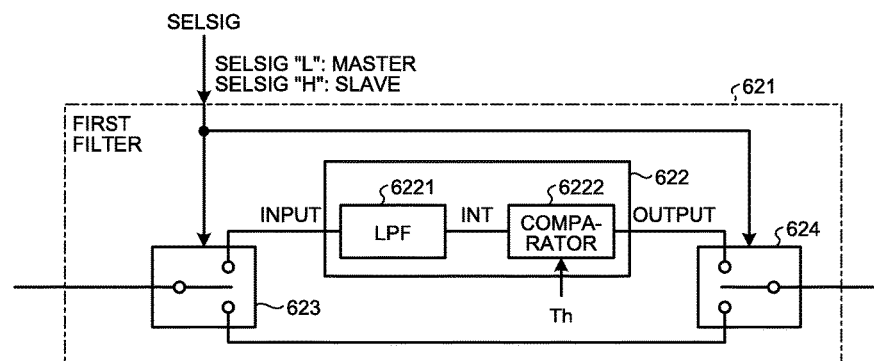
FIGS. 19A to 19C are diagrams illustrating a configuration example and operation examples of a first filter.
Figure 19B:
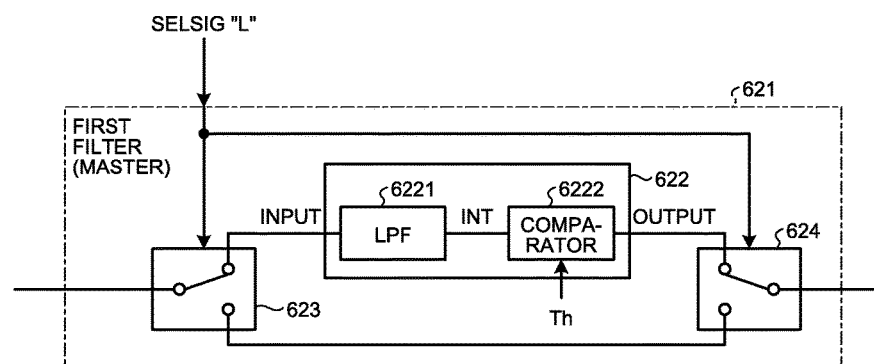
Figure 19C:
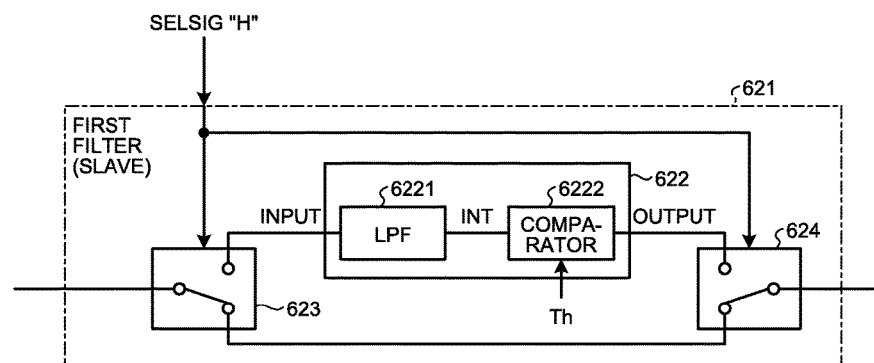

FIGS. 19A to 19C are diagrams illustrating a configuration example and operation examples of the first filter. FIG. 19A illustrates a configuration example of the first filter 621, FIG. 19B illustrates an operation example in a case in which the driver IC (MASTER) 6 serving as the master device includes the first filter 621, and FIG. 19C illustrates an operation example in a case in which the driver IC (SLAVE) 6 serving as the slave device includes the first filter 621.

In the examples illustrated in FIGS. 19A to 19C, the first filter 621 includes a filter circuit 622 and switch circuits 623 and 624.

The filter circuit 622 includes a low-pass filter (LPF) 6221 and a comparator 6222.

When the driver IC 6 including the first filter 621 is the master device (driver IC (MASTER) 6), a route passing through the filter circuit 622 is selected (FIG. 19B), and when the driver IC 6 including the first filter 621 is the slave device (driver IC (SLAVE) 6), a route bypassing the filter circuit 622 is selected (FIG. 19C).

The first filter 621 causes the anomaly detection signal ERRDET (MASTER) to be passed therethrough when anomaly continues for a predetermined time. That is, the anomaly processing request signal REQ for the anomaly processor (MASTER) 63 and the anomaly processing request signal REQ for the anomaly processor (SLAVE) 63 can be delayed.

Figure 20:
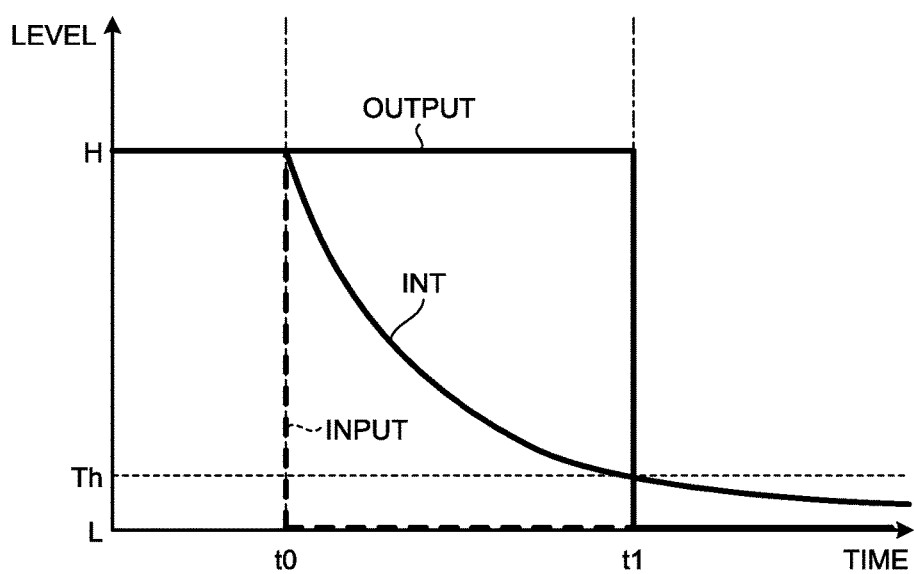
FIG. 20 is a diagram illustrating an example of an input/output characteristic of a filter circuit illustrated in FIGS. 19A to 19C.

FIG. 20 is a diagram illustrating an example of an input/output characteristic of the filter circuit illustrated in FIGS. 19A to 19C. In the example illustrated in FIG. 20, an input (INPUT) of the filter circuit 622 is switched from "H" to "L" at time t0. In FIG. 20, Th indicates a threshold for an output (INT) of the LPF 6221.

As illustrated in FIG. 20, after the time t0 at which the input (INPUT) of the filter circuit 622 is switched from "H" to "L", an output of the comparator 6222, that is, an output (OUTPUT) of the filter circuit 622 is switched from "H" to "L" at time t1 at which the output (INT) of the LPF 6221 falls below the threshold Th with a time constant of the LPF 6221. Thus, the time t1 at which predetermined anomaly processing is performed by the anomaly processor 63 can be delayed as compared with the time t0 at which the input (INPUT) of the filter circuit 622 is switched from "H" to "L".

Modification

Figure 21A:
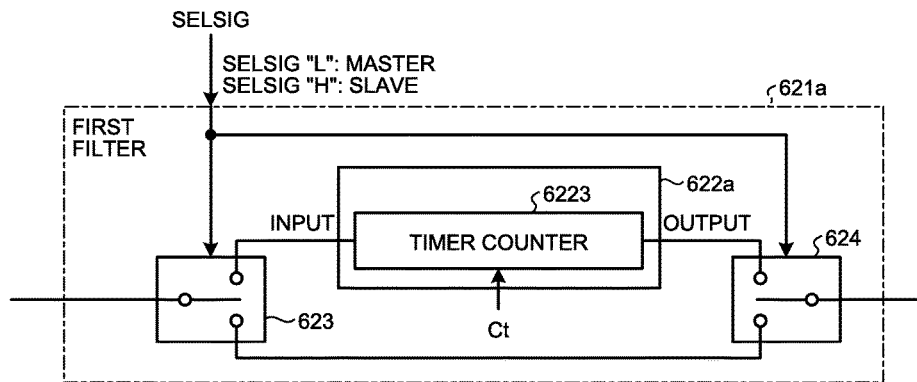
FIGS. 21A to 21C are diagrams illustrating a configuration example and operation examples of the first filter different from those in FIGS. 19A to 19C.
Figure 21B:
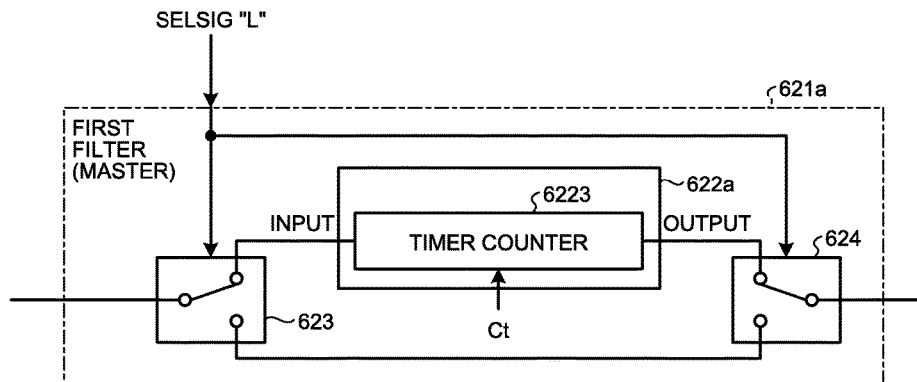
Figure 21C:
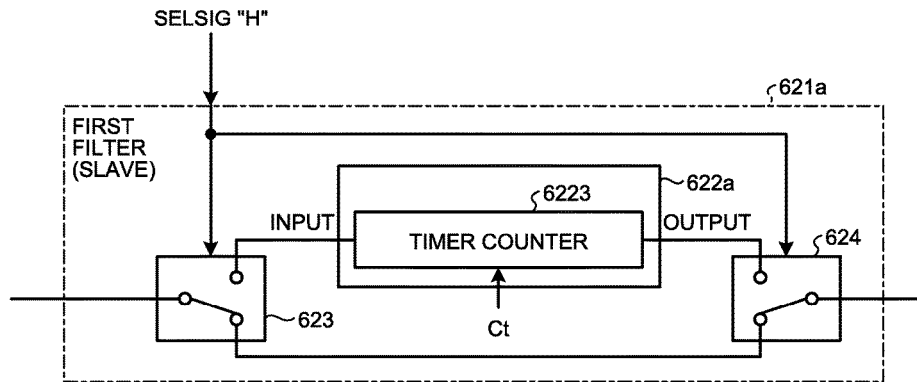

FIGS. 21A to 21C are diagrams illustrating a configuration example and operation examples of the first filter different from those in FIGS. 19A to 19C. FIG. 21A illustrates a configuration example of a first filter 621a, FIG. 21B illustrates an operation example in a case in which the driver IC (MASTER) 6 serving as the master device includes the first filter 621a, and FIG. 21C illustrates an operation example in a case in which the driver IC (SLAVE) 6 serving as the slave device includes the first filter 621a.

In the examples illustrated in FIGS. 21A to 21C, the first filter 621a includes a filter circuit 622a.

The filter circuit 622a includes a timer counter 6223.

When the driver IC 6 including the first filter 621a is the master device (driver IC (MASTER) 6), a route passing through the filter circuit 622a is selected (FIG. 21B), and when the driver IC 6 including the first filter 621a is the slave device (driver IC (SLAVE) 6), a route bypassing the filter circuit 622a is selected (FIG. 21C).

With this configuration, the anomaly detection signal ERRDET (MASTER) can be passed therethrough when anomaly continues for a predetermined time. That is, the anomaly processing request signal REQ for the anomaly processor (MASTER) 63 and the anomaly processing request signal REQ for the anomaly processor (SLAVE) 63 can be delayed.

Figure 22:
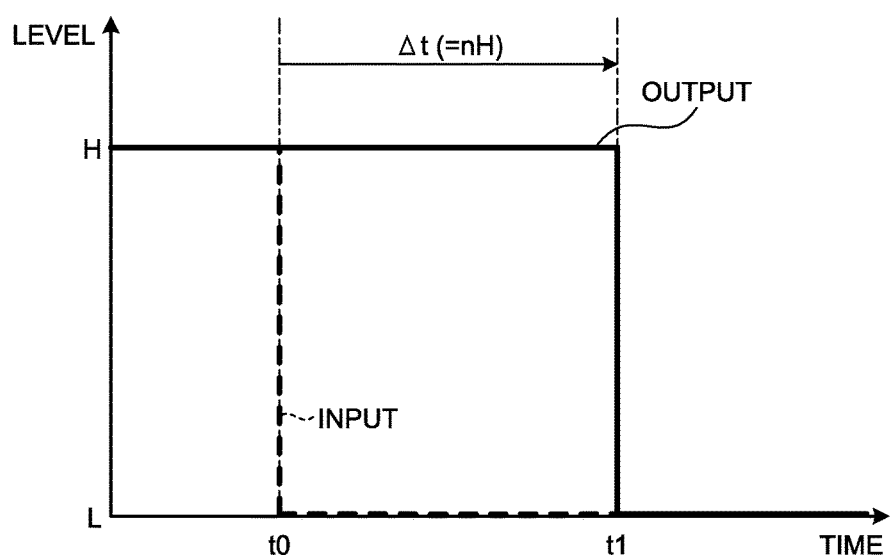
FIG. 22 is a diagram illustrating an example of the input/output characteristic of the filter circuit illustrated in FIGS. 21A to 21C.

FIG. 22 is a diagram illustrating an example of the input/output characteristic of the filter circuit illustrated in FIGS. 21A to 21C. In the example illustrated in FIG. 22, an input (INPUT) of the filter circuit 622a is switched from "H" to "L" at the time to. In FIG. 22, Ct indicates a count value of the timer counter 6223.

As illustrated in FIG. 22, after the time t0 at which the input (INPUT) of the filter circuit 622a is switched from "H" to "L", an output of the timer counter 6223, that is, the output (OUTPUT) of the filter circuit 622a is switched from "H" to "L" at the time t1 at which the count value Ct, for example, time $\Delta t$ (=nH), set by the timer counter 6223 elapses from the time t0. The time $\Delta t$ (=nH) is time during which a horizontal period H of the display apparatus 1 is counted n times. Thus, the time t1 at which predetermined anomaly processing is performed by the anomaly processor 63 can be delayed as compared with the time t0 at which the input (INPUT) of the filter circuit 622a is switched from "H" to "L".

As described above, the semiconductor apparatus 5 according to the second embodiment includes the first filter 621 that passes the anomaly detection signal ERRDET (MASTER) therethrough when anomaly continues for a predetermined time. With this configuration, the time t1 at which predetermined anomaly processing is performed by the anomaly processor 63 can be delayed as compared with the first embodiment. Accordingly, for example, the anomaly processor 63 can be prevented from malfunctioning due to harmonic noise and the like mixed in the anomaly processing request signal REQ. For example, in a case in which anomaly in each function of the semiconductor apparatus 5, that is, each function of the driver IC (MASTER) 6 and the driver IC (SLAVE) 6 is resolved before a predetermined time has elapsed from the time when anomaly occurs, predetermined anomaly processing can be prevented from being performed by the anomaly processor 63.

According to the present embodiment, provided is the semiconductor apparatus 5 that can resolve mismatching among a plurality of driver ICs (semiconductor devices) 6 caused by malfunction in one or a plurality of driver ICs (semiconductor devices) 6.

Third Embodiment

Figure 23:
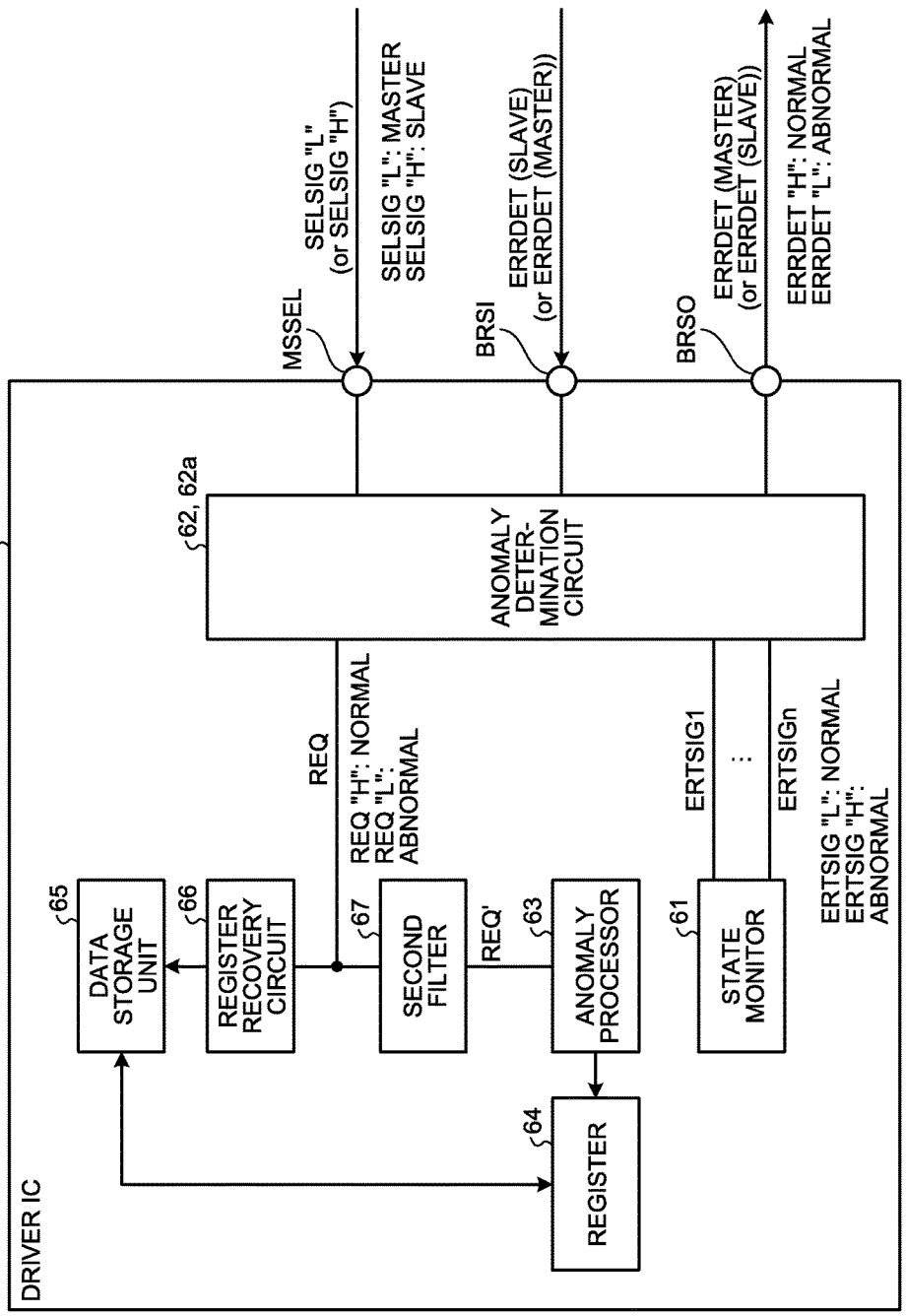
FIG. 23 is a diagram illustrating an example of an internal configuration of a driver IC included in a semiconductor apparatus according to a third embodiment.

FIG. 23 is a diagram illustrating an example of an internal configuration of the driver IC included in the semiconductor apparatus according to a third embodiment. A schematic configuration of the display system to which the semiconductor apparatus according to the third embodiment is applied, a block configuration of the display apparatus, the state monitor, and the internal logic configuration of the anomaly determination circuit are the same as those in the first embodiment or the second embodiment described above, so that redundant description will not be repeated.

With the configuration according to the first and the second embodiments described above, if anomaly occurs in a function of any driver IC 6 in the semiconductor apparatus 5 including a plurality of driver ICs 6, anomaly processing such as initialization of the operation parameter values stored in the register 64 is performed. However, for example, in a case where anomaly in a function is caused by garbled data of the operation parameter values in the register 64, overwriting (hereinafter, also referred to as "refreshing") of each operation parameter value in the register 64 with setting data may resolve anomaly in each function of the semiconductor apparatus 5, that is, in each function of the driver IC (MASTER) 6 and the driver IC (SLAVE) 6 without otherwise stopping image display control in the display apparatus 1 due to anomaly processing performed by the anomaly processor 63.

As illustrated in FIG. 23, a driver IC 6a of the semiconductor apparatus 5 according to the third embodiment includes a data storage unit 65, a register recovery circuit 66, and a second filter 67 in addition to the configuration according to the first embodiment or the second embodiment.

The data storage unit 65 stores therein setting data for each operation parameter value in the register 64, that is, the operation parameter value in each function of the driver IC 6.

The register recovery circuit 66 overwrites each operation parameter value in the register 64 with the setting data stored in the data storage unit 65 based on the anomaly detection signal ERRDET (MASTER).

The second filter 67 outputs an anomaly processing request signal REQ' obtained by passing the anomaly processing request signal REQ therethrough when anomaly continues for a predetermined time.

Figure 24:
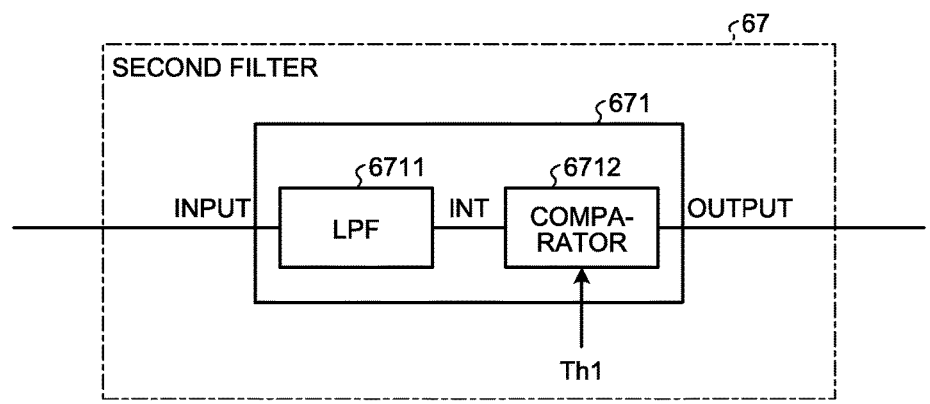
FIG. 24 is a diagram illustrating a configuration example of a second filter.

FIG. 24 is a diagram illustrating a configuration example of the second filter. In the example illustrated in FIG. 24, the second filter 67 includes a filter circuit 671.

The filter circuit 671 includes a low-pass filter (LPF) 6711 and a comparator 6712.

With the above configuration, the anomaly processing request signal REQ is output to the register recovery circuit 66, whereas, when anomaly continues for a predetermined time, the anomaly processing request signal REQ is passed through the second filter 67, and the anomaly processing request signal REQ' is output to the anomaly processor 63. Thus, before the anomaly processor 63 performs predetermined anomaly processing, the register recovery circuit 66 refreshes each operation parameter value in the register 64.

Figure 25:
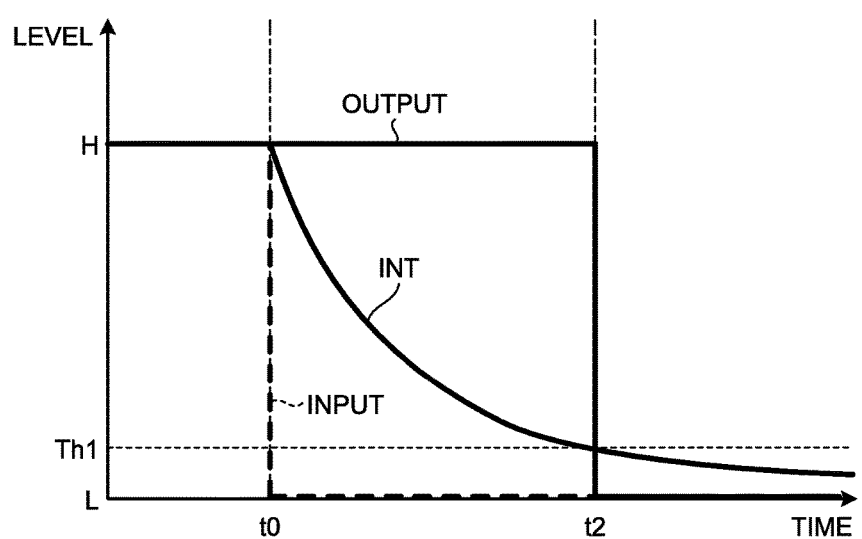
FIG. 25 is a diagram illustrating an example of the input/output characteristic of the second filter.

FIG. 25 is a diagram illustrating an example of the input/output characteristic of the filter circuit illustrated in FIG. 24. In the example illustrated in FIG. 25, an input (INPUT) of the filter circuit 671, that is, the anomaly processing request signal REQ is switched from "H" to "L" at the time t0. In FIG. 25, Th1 indicates a threshold for an output (INT) of the LPF 6711.

As illustrated in FIG. 25, after the time t0 at which the input (INPUT) of the filter circuit 671, that is, the anomaly processing request signal REQ is switched from "H" to "L" and each operation parameter value in the register 64 is refreshed by the register recovery circuit 66, an output of the comparator 6712, that is, an output (OUTPUT) of the filter circuit 671 is switched from "H" to "L" at time t2 at which the output (INT) of the LPF 6711 falls below the threshold Th1 with a time constant of the LPF 6711. Accordingly, the time t2 at which the anomaly processor 63 performs predetermined anomaly processing can be delayed as compared with the time t0 at which the input (INPUT) of the filter circuit 671, that is, the anomaly processing request signal REQ is switched from "H" to "L" and each operation parameter value in the register 64 is refreshed by the register recovery circuit 66.

Modification

Figure 26:
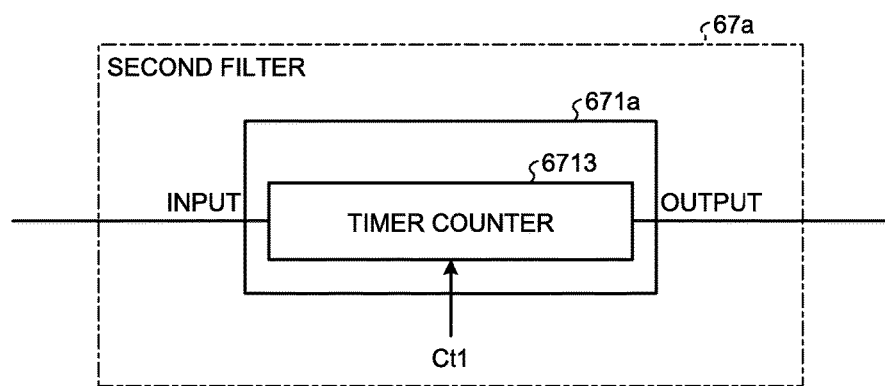
FIG. 26 is a diagram illustrating a configuration example of the second filter different from that in FIG. 24.

FIG. 26 is a diagram illustrating a configuration example of the second filter different from that in FIG. 24. In the example illustrated in FIG. 26, a second filter 67a includes a filter circuit 671a.

The filter circuit 671a includes a timer counter 6713.

Accordingly, the anomaly processing request signal REQ is output to the register recovery circuit 66, whereas, when anomaly continues for a predetermined time, the anomaly processing request signal REQ is passed through the second filter 67a, and the anomaly processing request signal REQ' is output to the anomaly processor 63. Thus, before the anomaly processor 63 performs predetermined anomaly processing, the register recovery circuit 66 refreshes each operation parameter value in the register 64.

Figure 27:
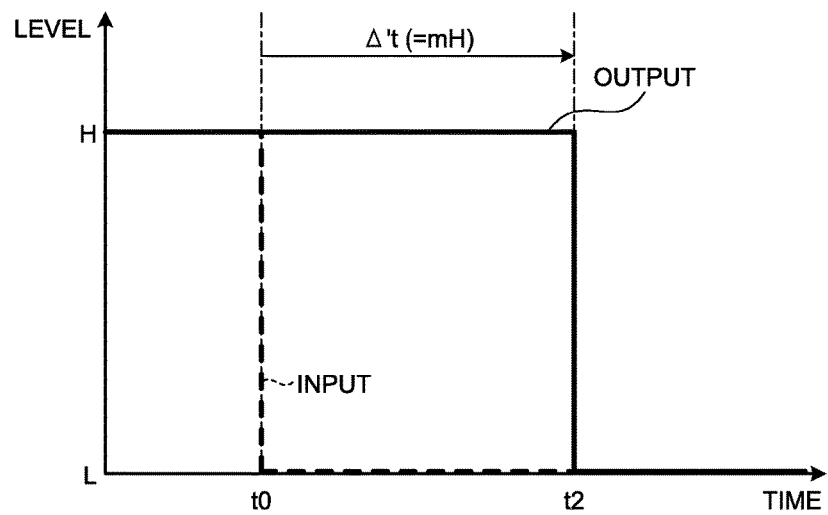
FIG. 27 is a diagram illustrating an example of the input/output characteristic of the filter circuit illustrated in FIG. 26.

FIG. 27 is a diagram illustrating an example of the input/output characteristic of the filter circuit illustrated in FIG. 26. In the example illustrated in FIG. 27, an input (INPUT) of the filter circuit 671a is switched from "H" to "L" at the time t0. In FIG. 27, Ct1 indicates a count value of the timer counter 6713.

As illustrated in FIG. 27, after the time t0 at which the input (INPUT) of the filter circuit 671, that is, the anomaly processing request signal REQ is switched from "H" to "L" and each operation parameter value in the register 64 is refreshed by the register recovery circuit 66, an output of the timer counter 6713, that is, an output (OUTPUT) of the filter circuit 671 is switched from "H" to "L" at the time t2 at which the count value Ct1, for example, time $\Delta t'$ (=mH), set by the timer counter 6713 elapses from the time t0. The time $\Delta t'$ (=mH) is time during which the horizontal period H of the display apparatus 1 is counted m times. Accordingly, the time t2 at which the anomaly processor 63 performs predetermined anomaly processing can be delayed as compared with the time t0 at which the input (INPUT) of the filter circuit 671, that is, the anomaly processing request signal REQ is switched from "H" to "L" and each operation parameter value in the register 64 is refreshed by the register recovery circuit 66.

That is, with the configuration illustrated in FIG. 26, each operation parameter value in the register 64 can be refreshed by the register recovery circuit 66 before the anomaly processor 63 performs predetermined anomaly processing. Thus, when anomaly is resolved in each function of the semiconductor apparatus 5, that is, in each function of the driver IC (MASTER) 6a and the driver IC (SLAVE) 6a by refreshing those values, the predetermined anomaly processing can be prevented from being performed by the anomaly processor 63. That is, anomaly can be resolved in each function of the semiconductor apparatus 5 without otherwise stopping image display control in the display apparatus 1 due to the predetermined anomaly processing performed by the anomaly processor 63.

Figure 28:
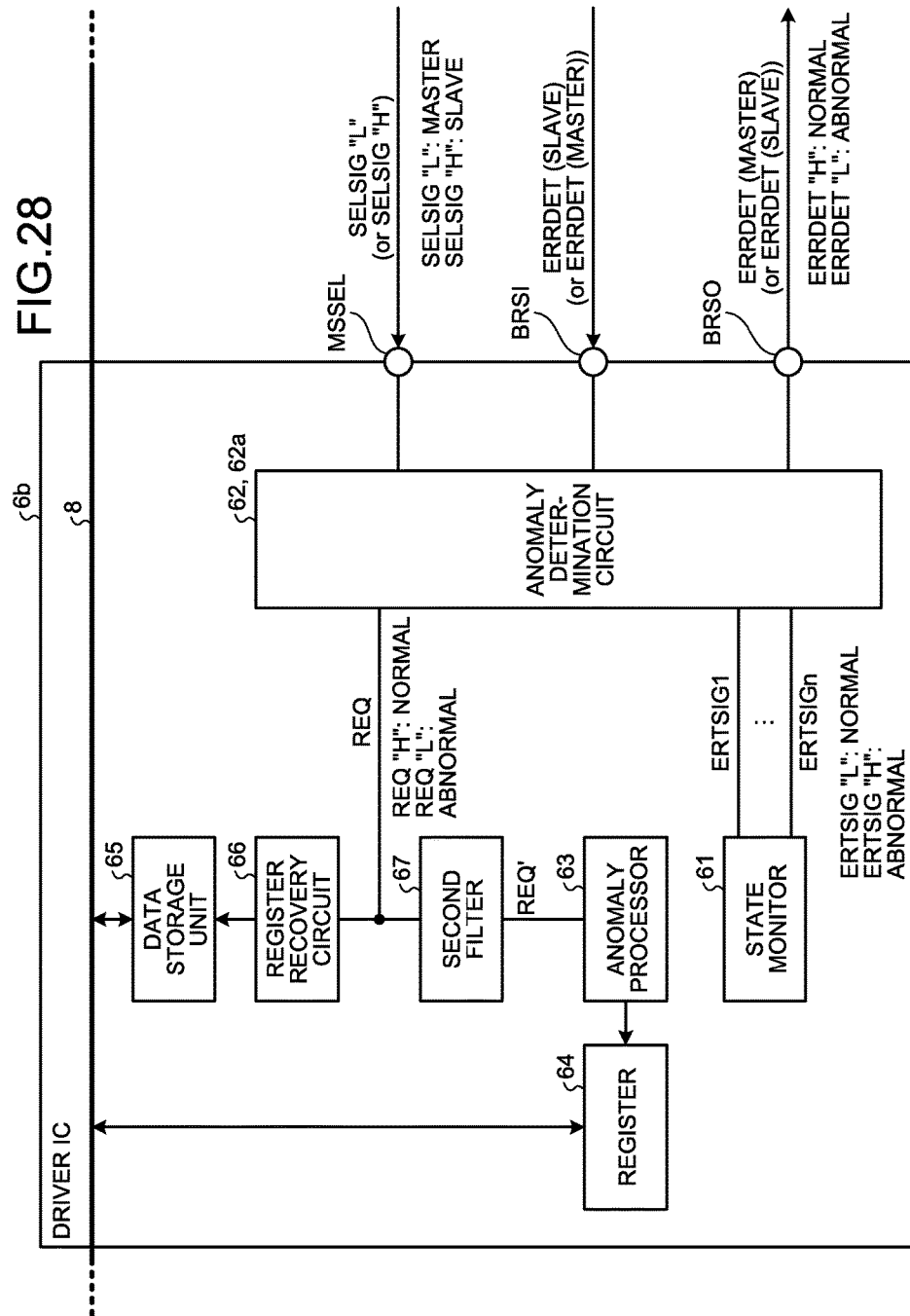
FIG. 28 is a diagram illustrating an example of an internal configuration of the driver IC included in the semiconductor apparatus according to the third embodiment different from that in FIG. 23.

FIG. 28 is a diagram illustrating an example of an internal configuration of the driver IC included in the semiconductor apparatus according to the third embodiment different from that in FIG. 23.

In the example illustrated in FIG. 28, driver ICs 6b each include a serial bus interface, and driver ICs 6b are coupled to one another via a serial bus 8. The serial bus 8 includes, for example, a bus line that transmits signals including a serial data signal, a serial clock signal, and a chip select signal.

With the configuration illustrated in FIG. 28, before the anomaly processor 63 performs predetermined anomaly processing, the register recovery circuit 66 included in the driver IC (MASTER) 6b serving as the master device refreshes each operation parameter value in the register 64 included in each of the driver ICs 6b including a driver IC (MASTER) 6b via the serial bus 8. Such a configuration also allows the register recovery circuit 66 to refresh each operation parameter value in the register 64 before the anomaly processor 63 performs predetermined anomaly processing, in the same manner as the configuration illustrated in FIG. 23. Accordingly, when anomaly is resolved in each function of the semiconductor apparatus 5, that is, each function of the driver IC (MASTER) 6b and the driver IC (SLAVE) 6b, the predetermined anomaly processing can be prevented from being performed by the anomaly processor 63. That is, anomaly can be resolved in each function of the semiconductor apparatus 5 without otherwise stopping image display control in the display apparatus 1 due to the predetermined anomaly processing performed by the anomaly processor 63.

As described above, the semiconductor apparatus 5 according to the third embodiment includes the data storage unit 65 that stores therein the setting data for each operation parameter value in the register 64, the register recovery circuit 66 that overwrites each operation parameter value in the register 64 with the setting data stored in the data storage unit 65 based on the anomaly detection signal ERRDET, and the second filter 67 that passes therethrough the anomaly detection signal ERRDET (MASTER) that is input to the anomaly processor 63 when anomaly continues for a predetermined time. In the semiconductor apparatus 5 according to the third embodiment, each operation parameter value in the register 64 is refreshed by the register recovery circuit 66 before the anomaly processor 63 performs predetermined anomaly processing. Accordingly, when anomaly is resolved in each function of the semiconductor apparatus 5, that is, in each function of the driver IC (MASTER) 6b and the driver IC (SLAVE) 6b, the predetermined anomaly processing can be prevented from being performed by the anomaly processor 63. That is, anomaly can be resolved in each function of the semiconductor apparatus 5 without otherwise stopping image display control in the display apparatus 1 due to the predetermined anomaly processing performed by the anomaly processor 63.

According to the present embodiment, provided is the semiconductor apparatus 5 that can resolve mismatching among a plurality of driver ICs (semiconductor devices) 6a and 6b caused by malfunction in one or a plurality of driver ICs (semiconductor devices) 6a and 6b.

The embodiments have been described above. However, the present invention is not limited thereto. The components according to the present invention described above include a component that is easily conceivable by those skilled in the art, substantially the same component, and what is called an equivalent. The components described above can also be appropriately combined. In addition, the components can be variously omitted, replaced, and modified without departing from the gist of the present invention.

What is claimed is:

1. A semiconductor apparatus comprising:
a plurality of semiconductor devices that includes a first semiconductor device including a first anomaly detection circuit and a second semiconductor device including a second anomaly detection circuit,
wherein the first anomaly detection circuit is configured to detect anomalies in a plurality of first functions implemented in the first semiconductor device and output a first anomaly detection signal to the second anomaly detection circuit and a device outside the semiconductor apparatus,
wherein the second anomaly detection circuit is configured to detect anomalies in a plurality of second functions implemented in the second semiconductor device and output a second anomaly detection signal to the first anomaly detection circuit,
wherein the first anomaly detection circuit is configured to generate the first anomaly detection signal when the first anomaly detection circuit detects (a) an anomaly in at least one of the first functions, (b) the second anomaly detection signal that is output from the second anomaly detection circuit, or (c) both,
wherein the second anomaly detection circuit is configured to generate the second anomaly detection signal when the second anomaly detection circuit detects an anomaly in at least one of the second functions,
wherein the semiconductor devices each comprise a first filter, and
wherein the first filter of the first semiconductor device passes the generated first anomaly detection signal therethrough when an anomaly in at least one of the first and second functions continues for a predetermined time.

2. The semiconductor apparatus according to claim 1,
wherein the semiconductor devices each comprise an anomaly processor configured to perform predetermined anomaly processing based on the first anomaly detection signal.

3. The semiconductor apparatus according to claim 2,
wherein the anomaly processor of each of the semiconductor devices is configured to perform a same kind of anomaly processing.

4. The semiconductor apparatus according to claim 2,
wherein the semiconductor devices each comprise a register,
wherein the register of the first semiconductor device stores therein a parameter value of each of the first functions,
wherein the register of the second semiconductor device stores therein a parameter value of each of the second functions, and
wherein each of the anomaly processors initializes the parameter value in its respective register as the anomaly processing.

5. The semiconductor apparatus according to claim 4,
wherein the semiconductor devices each comprise:
a data storage unit that stores therein setting data for the parameter value in its respective register;
a register recovery circuit that overwrites the parameter value in its respective register with the setting data stored in the data storage unit based on the first anomaly detection signal; and
a second filter that passes therethrough the first anomaly detection signal that is to be input to the anomaly processor when an anomaly in at least one of the first and second functions continues for a predetermined time.

6. The semiconductor apparatus according to claim 5,
wherein the register recovery circuit included in the first semiconductor device overwrites the parameter value in the register included in each of the semiconductor devices with the setting data stored in the data storage unit included in the first semiconductor device based on the first anomaly detection signal.

7. The semiconductor apparatus according to claim 5,
wherein the second filter comprises a low-pass filter.

8. The semiconductor apparatus according to claim 5,
wherein the second filter comprises a timer counter.

9. The semiconductor apparatus according to claim 1,
wherein the semiconductor devices comprise a switching module that switches each of the semiconductor devices between a first mode in which a respective one of the semiconductor devices is set as the first semiconductor device and a second mode in which the respective one of the semiconductor devices is set as the second semiconductor device.

10. The semiconductor apparatus according to claim 1,
wherein the first filter comprises a low-pass filter.

11. The semiconductor apparatus according to claim 1,
wherein the first filter comprises a timer counter.

12. A display apparatus comprising:
a display region including a first region and a second region; and
a semiconductor apparatus including
a master device that includes a first anomaly detection circuit and is configured to perform image display in the first region, and a slave device that includes a second anomaly detection circuit and is configured to perform image display in the second region, wherein the first anomaly detection circuit is configured to detect anomalies in a plurality of first functions implemented in the master device and output a first anomaly detection signal to the second anomaly detection circuit and a device outside the semiconductor apparatus, wherein the second anomaly detection circuit is configured to detect anomalies in a plurality of second functions implemented in the slave device and output a second anomaly detection signal to the first anomaly detection circuit, wherein the first anomaly detection circuit is configured to generate the first anomaly detection signal when the first anomaly detection circuit detects (a) an anomaly in at least one of the first functions, (b) the second anomaly detection signal that is output from the second anomaly detection circuit, or (c) both, wherein the second anomaly detection circuit is configured to generate the second anomaly detection signal when the second anomaly detection circuit detects an anomaly in at least one of the second functions, wherein the master device is configured to perform anomaly processing on the master device based on the first anomaly detection signal, wherein the slave device is configured to perform anomaly processing on the slave device based on the first anomaly detection signal that is output from the first anomaly detection circuit, wherein the semiconductor devices each comprise a first filter, and wherein the first filter of the first semiconductor device passes the generated first anomaly detection signal therethrough when an anomaly in at least one of the first and second functions continues for a predetermined time.

* * * * *